United States Patent
Eudier et al.

(10) Patent No.: US 12,159,552 B2
(45) Date of Patent: Dec. 3, 2024

(54) NON-BIOLOGICAL SKIN MODEL

(71) Applicant: UNIVERSITE LE HAVRE NORMANDIE, Le Havre (FR)

(72) Inventors: Florine Eudier, Le Havre (FR); Michel Grisel, Saint-Martin-Aux-Arbres (FR); Céline Picard, Montivilliers (FR); Géraldine Savary, Sainte-Adresse (FR)

(73) Assignee: UNIVERSITE LE HAVRE NORMANDIE, Le Havre (FR)

( * ) Notice: Subject to any disclaimer, the term of this patent is extended or adjusted under 35 U.S.C. 154(b) by 948 days.

(21) Appl. No.: 17/271,854

(22) PCT Filed: Aug. 30, 2019

(86) PCT No.: PCT/EP2019/073194
§ 371 (c)(1),
(2) Date: Feb. 26, 2021

(87) PCT Pub. No.: WO2020/043873
PCT Pub. Date: Mar. 5, 2020

(65) Prior Publication Data
US 2021/0209967 A1 Jul. 8, 2021

(30) Foreign Application Priority Data

Aug. 30, 2018 (EP) .................................. 18306149

(51) Int. Cl.
*G09B 23/30* (2006.01)
*C09D 191/00* (2006.01)

(52) U.S. Cl.
CPC .......... *G09B 23/30* (2013.01); *C09D 191/00* (2013.01)

(58) Field of Classification Search
CPC ............................... G09B 23/28; G09B 23/30
See application file for complete search history.

(56) References Cited

U.S. PATENT DOCUMENTS 4,481,001 A * 11/1984 Graham ............... G09B 23/285
434/267
4,877,454 A * 10/1989 Charkoudian .......... C08L 89/06
446/385

(Continued)

FOREIGN PATENT DOCUMENTS

JP        3829001 B2    10/2006

OTHER PUBLICATIONS

Akazaki et al., *Age-related changes in skin wrinkles assessed by a novel three-dimensional morphometric analysis*, 147 British Journal of Dermatology; Clinical and Laboratory Investigations 689-695 (2002).

(Continued)

*Primary Examiner* — Kurt Fernstrom
(74) *Attorney, Agent, or Firm* — Panitch Schwarze Belisario & Nadel LLP; Erin M. Dunston

(57) ABSTRACT

The present invention relates to a non-biological skin model comprising a polymeric material reproducing skin surface topography that is coated with a lipid composition, wherein the polymeric material is a material having a surface free energy ($\gamma$) of between 14 and 60 mJ/m$^2$, wherein the lipid composition comprises from 14% to 60% of triglycerides, from 2% to 40% of free fatty acids, from 4% to 30% of wax esters, from 3% to 20% of squalene, and from 1% to 10% of cholesterol, and wherein the surface concentration of the lipid composition on the polymeric material is between 500 µg/cm$^2$ and 2500 µg/cm$^2$. The present invention also relates to a method for preparing said non-biological skin model and to its use for evaluating cosmetic products performance or for evaluating the effect of pollution on skin surface properties.

17 Claims, 12 Drawing Sheets

(56) References Cited

U.S. PATENT DOCUMENTS

| | | | | |
|---|---|---|---|---|
| 5,015,431 | A * | 5/1991 | Charkoudian | G09B 23/30 |
| | | | | 264/225 |
| 7,037,112 | B2 * | 5/2006 | Lord | G09B 23/28 |
| | | | | 434/262 |
| 7,549,866 | B2 * | 6/2009 | Cohen | G09B 23/30 |
| | | | | 434/267 |
| 10,144,204 | B2 * | 12/2018 | Patil | G09B 23/30 |
| 10,755,600 | B2 * | 8/2020 | Iverson | G09B 23/30 |
| 11,105,795 | B2 * | 8/2021 | Winkelman | G01N 33/5044 |

OTHER PUBLICATIONS

Cazabat et al., *Dynamics of Wetting: Effects of Surface Roughness*, 90 J. Phys. Chem. 5845-5849 (1986).

Charkoudian, *A model skin surface for testing adhesion to skin*, 39 J. Soc. Cosmet. Chem. 225-234 (Jul./Aug. 1988).

Dabrowska et al., *Materials used to simulate physical properties of human skin*, 22 Skin Research and Technology 3-14 (2016).

European Search Report issued in EP Application No. 18306149 (Jan. 24, 2019).

Fageon et al., *Importance of sunscreen products spreading protocol and substrate roughness for in vitro sun protection factor assessment*, 31 International Journal of Cosmetic Science 405-417 (2009).

Gerhardt et al., *Fabrication, Characterisation and Tribological Investigation of Artificial Skin Surface Lipid Films*, 34(2) Tribology Letters 81-93 (2009).

Gilbert et al., *Impact of Polymers on Texture Properties of Cosmetic Emulsions: A Methodological Approach*, 27 Journal of Sensory Studies 392-402 (2012).

*IMS In Vitro SPF/UVA Protocol for use with VITRO-SKIN Substrate*, (n.d.). http://www.ims-usa.com/ittrium/reference/A1x75bx1 xa4y1x762x1xa1y1x844x1x65y1x774x1x65y1x7bex1x65y1x85ax 1x94y8x7c0x8x1/HydrationProtocol_ UpdatedbyPTSJanuary2012rev1308.pdf (accessed Apr. 29, 2016) 1-2 (Jul. 19, 2021).

International Search Report issued in International Application No. PCT/EP2019/073194 (Sep. 27, 2019).

Janczuk et al., *On the Consistency of Surface Free Energy Components as Calculated from Contact Angles of Different Liquids: An Application to the Cholesterol Surface*, 159 Journal of Colloid and Interface Science 421-428 (1993).

Jones et al., *Tribological influence of a liquid meniscus in human sebum cleaning*, 498 Colloids and Surfaces A: Physicochem. Eng. Aspects 268-275 (2016).

Lagarde et al., *Topography and anisotropy of the skin surface with ageing*, 11 Skin Research and Technology 110-119 (2005).

Mavon et al., *Changes in sebum levels and skin surface free energy components following skin surface washing*, 10 Colloids and Surfaces B: Biointerfaces 243-250 (1998).

Mavon et al., *Sebum and stratum corneum lipids increase human skin surface free energy as determined from contact angle measurements: A study on two anatomical sites*, 8(3) Colloids and Surfaces B: Biointerfaces 147-155 (Mar. 3, 1997) (Abstract Only).

Mendelsohn et al., *Determination of molecular conformation and permeation in skin via IR spectroscopy, microscopy, and imaging*, 1758 Biochimica Et Biophysica Acta 923-933 (2006).

Nachman et al., *Artificial Skin Model simulating dry and moist in vivo human skin friction and deformation behaviour*, 97 Tribology International 431-439 (2016).

Oliver et al., *An Experimental Study of Some Effects of Solid Surface Roughness on Wetting*, 1 Colloids and Surfaces 79-104 (1980).

Savary et al., *Impact of emollients on the spreading properties of cosmetic products: A combined sensory and instrumental characterization*, 102 Colloids and Surfaces B: Biointerfaces 371-378 (2013).

Stahl et al., *Characterisation of epidermal lipid composition and skin morphology of animal skin ex vivo*, 72 European Journal of Pharmaceutics and Biopharmaceutics 310-316 (2009).

Stefaniak et al., *Formulation and stability of a novel artificial sebum under conditions of storage and use*, 32 International Journal of Cosmetic Science 347-355 (2010).

Van Oss et al., *Additive and Nonadditive Surface Tension Components and the Interpretation of Contach Angles*, 4 Langmuir 884-891 (1988).

Wagner et al., *pH profiles in human skin: influence of two in vitro test systems for drug delivery testing*, 55 European Journal of Pharmaceutics and Biopharmaceutics 57-65 (2003).

Wenzel, *Resistance of Solid Surfaces to Wetting by Water*, 28(8) Industrial and Engineering Chemistry 988-994 (Aug. 1936).

* cited by examiner

NON-BIOLOGICAL SKIN MODEL

CROSS-REFERENCE TO RELATED APPLICATIONS

This application is a U.S. National Stage Application pursuant to 35 U.S.C. § 371 of International Patent Application PCT/EP2019/073194, filed on Aug. 30, 2019, and published as WO 2020/043873 on Mar. 5, 2020, which claims priority to European Patent Application 18306149.8, filed on Aug. 30, 2018, all of which are incorporated herein by reference in their entireties for all purposes.

TECHNICAL FIELD

The invention relates to a non-biological skin model that mimics skin surface properties and its method of preparation. In particular, the invention relates to a non-biological skin model comprising a polymeric material reproducing skin surface topography that is coated with a lipid composition in order to reproduce skin surface free energy.

TECHNICAL BACKGROUND

Skin is the most extensive and heaviest human organ. It plays a fundamental protective role for our whole body. One of its most important functions is to control the penetration of external compounds and microorganisms into human body and to limit excessive water loss. This skin barrier property is mainly related to the stratum corneum, its external layer composed of dead cells, the corneocytes, kept stuck together thanks to intercellular lipids which act as stratum corneum "cement". This external dead layer is in direct contact with external environment and with any product applied onto skin surface. Both corneocytes and intercellular lipids integrity condition the efficacy of skin barrier function and the interaction between the skin and its environment.

Studying skin surface properties is consequently of great interest to better understand corneocytes and lipids roles in penetration or permeation phenomenon. Those phenomena are relative to passive diffusion and to contact area between skin and external compounds, which are both related to skin physico-chemistry. This important property describes how skin interacts with its environment and how a compound or product topically applied interacts with skin.

Using the Van Oss approach for surface free energy determination, previous in vivo studies showed that skin physico-chemistry is greatly impacted by the presence of sebaceous lipids on its surface: the forearm skin, poor in sebum, behaves as a weakly monopolar basic (hydrophobic) surface whereas the forehead skin, rich in sebum, behaves as a strongly monopolar basic (hydrophilic) surface. Those observations are explained by both lipids amount and composition: sebum is enriched in amphiphilic lipids, especially free fatty acids, which increase the monopolar basic behaviour of sebum-rich skins [1,2].

When studying the impact of harmful factors on skin physico-chemistry, such as UV radiations, urban pollutants, new cosmetic or pharmaceutical products whose toxicity data are not available, in vivo measurements are not feasible due to raw material potential toxicity and regulation. In addition, surface free energy determination needs the use of toxic compounds such as diiodomethane which is injurious in case of skin contact. Consequently, skin models have to be developed and used.

Animal models are available, such as pig skin and rat skin. They present similarity with human skin but also differences, above all concerning lipid composition which can impact their physico-chemistry [3]. Moreover, in the framework of a cosmetic study, ethical and legal question are raised: the European Union prohibits all animal tested products since 2013.

Some alternative skin models have been developed to reduce the use of animals for cosmetic researches. Reconstructed human skin and human skin explants are probably the most powerful models because their behaviour, structure and composition are similar to in vivo skin. However, those two models are very expensive, require strict conditions in the use and show limited life duration. Consequently, simple non-biological surfaces can preferably be used to mimic skin surface properties and to study the frictional and mechanical properties or the adhesion properties [4-7]. Non-biological skin models are hence commercially available such as the Vitroskin® which has been specifically developed to mimic skin surface properties (pH, ionic strength, physico-chemistry). The main disadvantage of those commercial products is that their composition remains unknown and unchangeable, thus they can be considered as "black boxes".

Therefore, there is a need for providing a new fairly simple, reliable, cheap and easy to handle synthetic surface owning properties equivalent to in vivo human skin. In particular, there is a need for providing a non-biological skin model (NBSM) of controlled and tunable composition which mimics skin surface properties, chemical composition and topography thus imitating its physico-chemistry.

SUMMARY OF THE INVENTION

The present invention meets the aforementioned need.

The inventors have surprisingly found that a non-biological skin model comprising a polymeric material reproducing skin surface topography that is coated with a specific and controlled lipid composition with a surface concentration of the lipid composition on the polymeric material between 500 µg/cm$^2$ and 2500 µg/cm$^2$, is suitable for mimicking skin surface properties, chemical composition and topography thus imitating its physico-chemistry.

When compared to existing models, the Non-Biological Skin Model (NBSM) according to the invention has the advantage to reproduce real human surface topography. The present NBSM technology is further fully versatile, it represents high potential as a way to deepen the understanding of the skin micro relief impact on its physico-chemistry and on cosmetic products interactions and spreading behaviour onto the skin.

An object of the invention is thus a non-biological skin model (NBSM) comprising a polymeric material reproducing skin surface topography that is coated with a lipid composition, wherein the polymeric material is a material having a surface free energy ($\gamma$) of between 14 and 60 mJ/m$^2$; wherein the lipid composition comprises from 14% to 60% of triglycerides, from 2% to 40% of free fatty acids, from 4% to 30% of wax esters, from 3% to 20% of squalene, and from 1% to 10% of cholesterol; and wherein the surface concentration of the lipid composition on the polymeric material is between 500 µg/cm$^2$ and 2500 µg/cm$^2$.

A second object of the invention is a method for preparing a non-biological skin model, comprising the following steps:
 a) Preparing a skin print with a negative relief of the skin;
 b) Molding back the skin print using a polymeric material that is a material having a surface free energy ($\gamma$) of between 14 and 60 mJ/m$^2$;

c) Hardening;
d) Preparing a lipid composition comprising from 14% to 60% of triglycerides, from 2% to 40% of free fatty acids, from 4% to 30% of wax esters, from 3% to 20% of squalene, and from 1% to 10% of cholesterol, and being free of solvent;
e) Optionally heating the lipid composition until complete liquefaction,
f) Applying the liquid lipid composition onto the polymeric material;
g) Optionally, heating for homogenization; and
h) Optionally, wiping off the excess lipid composition and heating again for homogenization.

A third object of the invention is the use of the non-biological skin model of the invention for evaluating cosmetic products performance or evaluating the effect of pollution on skin surface properties.

A fourth object of the invention is the use non-biological skin model of the invention for evaluating the physico-chemistry of the skin, or evaluating the impact of the lipid composition or the skin topography on the surface free energy ($\gamma$) of the skin.

DEFINITIONS

Figure 1:
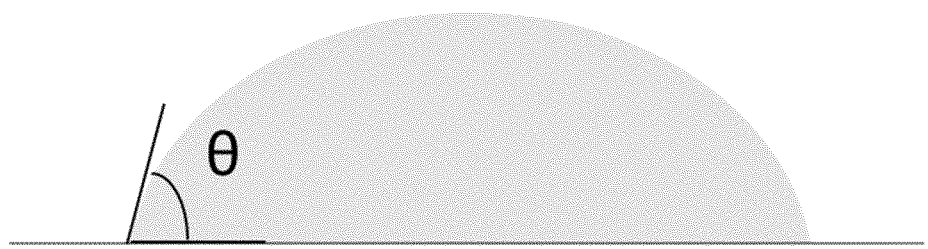
FIG. 1 represents a contact angle $\theta$ formed by a liquid droplet on a solid surface.

The terms "non-biological skin model" as used in the invention refer to non-biological experimental systems that recreate aspects of human skin surface topography, chemistry, physico-chemistry, representing healthy or damaged skin.

The terms "skin surface topography" as used in the invention refer to the depth, density, and arrangements of the lines and/or grooves of the skin.

The terms "polymeric material" as used in the invention refer to a material reproducing skin surface topography and to which a coating layer may be stably affixed and removable. In the present specification, the terms "polymeric material", "polymeric support", "substrate" are used as synonyms.

The terms "lipid composition" as used in the invention refer to a composition that mimics skin surface lipid composition. Said composition is chemically close to the composition of skin sebum and epidermal lipids, i.e. the lipid composition comprises the appropriate types of lipids at levels that match human values. In the present specification, the terms "lipid composition", "artificial skin lipids", "coating layer", "lipid coating", "skin lipids layer", are used as synonyms. In all the embodiments of the invention, all percentages of materials in the lipid composition are expressed by weight in relation to the total weight of the lipid composition, unless specifically stated otherwise.

The terms "skin print with a negative relief of the skin" as used in the invention refer to a mold created by placing a suitable material on the keratinous tissue or body part of interest, and removing the material from the tissue. The resulting skin print with negative relief, also called "negative mold", contains an impression of the keratinous tissue or body part and thus can be used to create a positive mold.

The terms "surface free energy" as used in the invention refer to a physico-chemical property of materials. It corresponds to the energy needed to increase the size of a single phase surface by a unit of area. From a microscopic scale, it characterizes the forces involved in the material integrity such as Van der Waals forces or the hydrogen bounding.

From a macroscopic scale, surface free energy is involved in surface wettability. The surface free energy can be measured by several methods known by the one skilled in the art, for example by contact angle calculation, using the sessile drop method. The method used in the present invention is particularly disclosed in example 2.C.

The terms "surface concentration" as used in the invention refer to the amount of lipids coated onto the polymeric material surface by unit area. The surface concentration can be measured by several methods known by the one skilled in the art, for example by weighing the polymeric material before and after lipid coating or using a Sebumeter®.

The term "skewness factor" or "Ssk" as used in the invention refers to the parameter that describes surface morphology: a positive Ssk value corresponds to a surface showing peaks and protuberance projecting above the average height whereas a negative Ssk value corresponds to a tray surface with deep scratches and pores. The skewness factor can be measured by several methods known by the one skilled in the art, for example from 3D images of surfaces according to the ISO 25178 norm, using the Mountains Map® software (Digital Surf SARL, Besançon, France).

The terms "contact angle" as used in the invention refer to the angle $\theta$ formed by a liquid droplet once deposited onto a solid surface (FIG. 1). The contact angle can be measured for example by using a goniometer and the sessile drop method.

The terms "viscoelastic material" as used in the invention refers to a material whose mechanical properties when subjected to deformation have on the one hand an elastic component and on the other hand a viscous component. A purely elastic material deforms under stress and then goes back to its original form when the stress is stopped. A purely viscous material deforms linearly with respect to the stress and does not return to its original form when the stress is stopped. A viscoelastic material therefore has an intermediate behavior between these two mechanical characteristics.

The terms "Lipids that are not crystallized" means that the geometric shape crystals of the lipid coating have dimensions lower than 10 µm, preferably lower than 5 µm, as measured on polarized light microscopy images.

DETAILED DESCRIPTION

The first object of the invention is a non-biological skin model (NBSM) comprising a polymeric material reproducing skin surface topography that is coated with a lipid composition, wherein the polymeric material is a material having a surface free energy ($\gamma$) of between 14 and 60 mJ/m$^2$; wherein the lipid composition comprises from 14% to 60% of triglycerides, from 2% to 40% of free fatty acids, from 4% to 30% of wax esters, from 3% to 20% of squalene, and from 1% to 10% of cholesterol, and wherein the surface concentration of the lipid composition on the polymeric material is between 500 µg/cm$^2$ and 2500 µg/cm$^2$.

Figure 2:
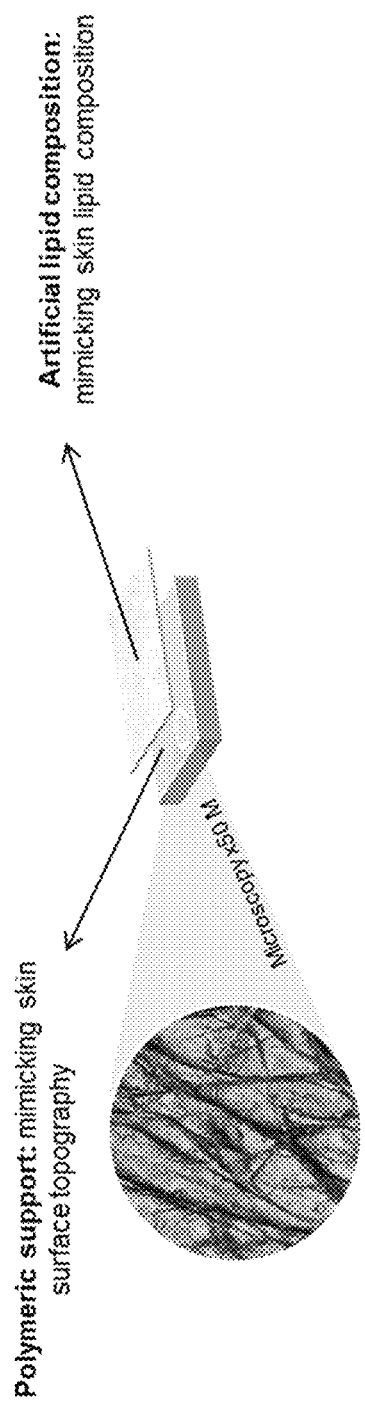
FIG. 2 represents the NBSM concept: an artificial skin made with silicone coated with an artificial lipid composition.

The non-biological skin model (NBSM) according to the invention thus comprises two distinct parts combined together (see FIG. 2): the first part is a polymeric material which reproduces skin surface topography, and the second part is an artificial skin lipids mixture which mimics lipid composition of skin. Advantageously, at least one surface of the polymeric material is coated with the lipids composition.

In the non-biological skin model of the invention, the polymeric material thus advantageously acts as a substrate. The polymeric material may be in any shape or form suitable for application of a product and for analysis of the substrate and/or its lipid coating. For example, the polymeric material may be in the form of a sheet having two substantially planar, parallel surfaces, and a substantially uniform thickness. Advantageously, the thickness of the polymeric material is from about 1 mm to about 1 cm. Alternatively, the polymeric material can be in the form of a body part, for example an arm, leg, hand, foot, finger, toe, upper torso, lower torso, etc.

In the context of the invention, the polymeric material is a material having a surface free energy ($\gamma$) of between 14 and 60 mJ/m$^2$. Such a polymeric material allows better reproducing skin surface topography and skin surface properties such as the roughness profiles of the skin or the surface energy of the skin. The polymeric material used in the invention is in particular a viscoelastic polymeric material. Advantageously, the polymeric material used in the invention is selected from the group of materials comprising or consisting in polyurethane, polymethylmethacrylate, polypropylene, polyamide, polysaccharides, protein, silicone or mixture thereof. More advantageously, the polymeric material used in the invention is selected from the group of materials comprising or consisting in polyurethane, polymethylmethacrylate, silicone, or mixture thereof. In particular, the polymeric material is a silicone material having a surface free energy ($\gamma$) of between 14 and 60 mJ/m$^2$. For example, the polymeric material used in the invention may be a commercial silicone rubber such as the silicone Dragon-Skin®20.

The polymeric material can be formed by means known by the one skilled in the art, for example, using a skin print with a negative relief of the skin into which the material is poured and harden. In this context, the skin print is advantageously a biocompatible silicon skin print such as the biocompatible silicon Body Double® or Silflo®, an alginate skin print, or a plaster skin print. More advantageously, the skin print is a biocompatible silicon skin print such as the biocompatible silicon Body Double® or Silflo®.

According to the invention, the lipid composition imitates skin surface lipid composition. The lipid composition comprises from 14% to 60% of triglycerides, from 2% to 40% of free fatty acids, from 4% to 30% of wax esters, from 3% to 20% of squalene, and from 1% to 10% of cholesterol.

Advantageously the lipid composition comprises triglycerides in a content from 14% to 60%, more advantageously from 25% to 40%, more advantageously from 28% to 35%, in particular 32%, by weight.

Advantageously the lipid composition comprises free fatty acids in a content from 2% to 40%, more advantageously from 20% to 35%, more advantageously from 25% to 30%, in particular 28%, by weight.

Advantageously the lipid composition comprises wax esters in a content from 4% to 30%, more advantageously from 15% to 26%, more advantageously from 20% to 26%, in particular 25%, by weight.

Advantageously the lipid composition comprises squalene in a content from 3% to 20%, more advantageously from 5% to 15%, more advantageously from 8% to 20%, in particular 10%, by weight.

Advantageously the lipid composition comprises cholesterol in a content from 1% to 10%, more advantageously from 1% to 6%, more advantageously from 2% to 6%, in particular 4%, by weight.

Advantageously the lipid composition also comprises cholesteryl oleate in a content from 0% to 9.5%, more advantageously from 1% to 9.5%, more advantageously from 1 to 5%, more advantageously from 1 to 3%, particularly 2%, by weight.

Advantageously the lipid composition also comprises cholesterol sulphate in a content from 0% to 2%, more advantageously from 0% to 1.8%, in particular from 0 to 1.5%.

Advantageously the lipid composition also comprises linear alkanes in a content from 0% to 9%, more advantageously from 0% to 7%, in particular from 0 to 6%.

Advantageously the lipid composition also comprises sphingolipids in a content from 0% to 20%, more advantageously from 0% to 19%, in particular from 0 to 18%.

The lipid composition advantageously comprises vitamin E in order to ensure the stability of the composition, advantageously in a content from 0% to 1% by weight, more advantageously in a content from 0.01% to 1% by weight, related to the total weight of the lipid composition.

The lipid composition of the invention thus comprises lipids at biologically relevant proportions, i.e. matched median values for humans and contained both saturated and monounsaturated wax ester, triglyceride, and free fatty acid components, and included cholesterol and advantageously cholesterol ester components and vitamin E.

An advantage of the lipid composition is that it can be adapted to different type of skin (normal skin, dry skin, oily skin, combination skin . . . ) or body area by adapting the contents of lipids. The lipid composition can also be tuned to mimic cutaneous disorders link to a modification in skin lipids such as atopic dermatitis or symptoms of dry skin.

Advantageously, the lipid composition comprises from 25% to 40% of triglycerides, from 20% to 35% of free fatty acids, from 15% to 26% of wax esters, from 5% to 15% of squalene, from 1% to 6% of cholesterol, from 1% to 5% of cholesteryl oleate, from 0.01 to 1% of vitamin E, from 0% to 1.8% of cholesterol sulphate, from 0% to 7% of linear alkanes, and from 0% to 19% of sphingolipids, by weight related to the total weight of the lipid composition.

More advantageously, the lipid composition comprises from 28% to 35% of triglycerides, from 25% to 30% of free fatty acids, from 20% to 26% of wax esters, from 8% to 12% of squalene, from 2% to 6% of cholesterol, and from 1% to 3% of cholesteryl oleate, from 0.01 to 1% of vitamin E, from 0% to 1.5% of cholesterol sulphate, from 0% to 6% of linear alkanes, and from 0% to 18% of sphingolipids, by weight related to the total weight of the lipid composition.

Even more advantageously, the lipid composition comprises 32% of triglycerides, 28% of free fatty acids, 25% of wax esters, 10% of squalene, 4% of cholesterol, and 2% of cholesteryl oleate, 0.01 of vitamin E, 0% of cholesterol sulphate, 0% of linear alkanes, and 0% of sphingolipids, by weight related to the total weight of the lipid composition.

Advantageously, the surface concentration of the lipid composition on the polymeric material is between 800 µg/cm² and 1800 µg/cm². If the surface concentration of the lipid composition onto the polymeric material is greater than 2500 µg/cm² or lower than 500 µg/cm², the non-biological skin model would have a surface free energy that is not in good agreement with the surface free energy calculated on human living skin explants, which is around 28.4±2.8 mJ/m².

Advantageously, the non-biological skin model of the invention has a surface free energy ($\gamma$) of between 24 mJ/m² and 45 mJ/m², more advantageously of between 26 mJ/m² and 33 mJ/m².

Advantageously, the lipid composition that coats the polymeric material is composed of lipids that are not crystallized. "Not crystallized" means that the geometric shape crystals of the lipid coating have dimensions lower than 10 µm, preferably lower than 5 µm, as measured on polarized light microscopy images. Therefore, the non-biological skin model of the invention exhibits an apparent homogeneous lipid coating over its entire surface (cf. FIG. 4C).

In the context of the invention, the surface concentration of the lipid composition and the non-crystallized lipid coating may be obtained in particular thanks to the specific coating method of the lipid composition on the polymeric material. This specific method is described below.

Further, the surface concentration of the lipid composition on the polymeric material and the homogenous lipid coating allows obtaining non-biological skin model that mimics the skin relief with much accuracy than the existed non-biological skin model. The surface relief of the NBSM may be determined by analysing its roughness profiles and in particular the skewness factor.

The roughness parameters are listed in table 1 and may be measured from 3D images of surfaces according to the ISO 25178 norm, using the Mountains Map® software (Digital Surf SARL, Besançon, France). The calculations have been performed on 3D images obtained using a Keyence Microscope VHX-1000 (Keyence Corporation TSE, Osaka, Japan) with the VH-Z100R lens at a magnification of ×300. 3D images were recorded in transmission mode and assembled to obtain a 1600×1200 pixels size.

TABLE 1

| Roughness parameters definitions | | |
|---|---|---|
| Roughness parameter | Unity | Definition |
| Sq | µm | Mean square height |
| Ssk | / | Skewness factor |
| Sp | µm | Maximum peaks height |
| Sv | µm | Maximum valleys height |
| Sz | µm | Maximum height |
| Sa | µm | Arithmetic mean height |

Advantageously, the non-biological skin model of the invention has a skewness factor between 0.0 and −2.5, more advantageously between −0.2 and −1.70, even more advantageously between −0.5 and −0.9. These values are in good agreement with in vivo literature data [8].

Advantageously, the non-biological skin model of the invention has an arithmetic mean height (Sa) of between 10 µm and 80 µm, more advantageously between 15 µm and 50 µm, more advantageously between 17 and 25 µm. These values are in good agreement with in vivo literature data [5,9].

Advantageously, the non-biological skin model of the invention has a maximum height (Sz) of between 75 µm and 2000 µm, more advantageously between 100 µm and 300 µm, more advantageously between 120 and 175 µm. These values are also in good agreement with in vivo literature data [5,9].

Further, the non-biological skin model of the invention has a surface pH of between 4.0 and 7.0; more advantageously between 4.2 and 6.8; more advantageously between 4.8 and 5.9. These values are in good agreement with in vivo literature data that are between 4.2 and 6.8 [10]. This pH value has been measured using a Skin-pH-Meter® (Courage+Khazaka Electronic GmbH, Koln, Germany) at ambient temperature (i.e. between 18° C. and 25° C.) and 50% humidity.

A second object of the invention is a method for preparing a non-biological skin model, comprising the following steps:
 a) Preparing a skin print with a negative relief of the skin;
 b) Molding back the skin print using a polymeric material that is a material having a surface free energy ($\gamma$) of between 14 and 60 mJ/m²;
 c) Hardening;
 d) Preparing a lipid composition comprising from 14% to 60% of triglycerides, from 2% to 40% of free fatty acids, from 4% to 30% of wax esters, from 3% to 20% of squalene, and from 1% to 10% of cholesterol, and being free of solvent;
 e) Optionally, heating the lipid composition until complete liquefaction,
 f) Applying the liquid lipid composition onto the polymeric material;
 g) Optionally, heating for homogenization; and
 h) Optionally, wiping off the excess lipid composition and heating again for homogenization.

In the method of the invention, the skin print with a negative relief of the skin, the polymeric material, and the lipid composition are as defined above in the description.

Steps a) and b) of the method of the invention are steps that can easily be made by methods known from the one skilled in the art, for example, using a skin print with a negative relief of the skin into which the material is poured and harden. In this context, the skin print is advantageously a biocompatible silicon skin print such as the biocompatible silicon Body Double®.

Step c) is also a step that can easily be made by method known from the one skilled in the art. In particular, the one skilled in the art would know how to adapt the time and conditions of hardening to obtain a polymeric material having the expected physical and mechanical properties. For example, when using the silicone DragonSkin®20 as polymeric material, the hardening last at least 4 h in ambient temperature (i.e. between 18° C. and 25° C.).

The particularity of the method of the invention lies in steps d) to g) and optionally d) to h). Indeed, the particularity of the method of the invention is that during the coating, the lipid composition that is applied onto the polymeric material is free of solvent. In contrast, in the coating methods known in the art, the lipid composition comprises lipids dissolved in a solvent, said solvent being evaporated after the coating. These methods lead to a lipid coating that is crystallized leading to surface properties that are not in agreement with the skin surface properties.

In the context of the present invention, the step d) of preparing the lipid composition advantageously comprises a step d1) of dissolving the lipids in a solvent, and a step d2) of evaporating all the solvent.

Advantageously, in step d1), the lipids are dissolved in a solvent to reach a concentration of between 1 and 20 g/L, more advantageously between 5 and 15 g/L of lipids.

Advantageously, in step d1), the solvent is selected from the group consisting of dichloromethane, methanol, ethanol, chloroform, ethyl acetate, toluene, acetone, dimethylsulfoxide, and mixtures thereof. Advantageously, the solvent is a mixture of chloroform and methanol, in particular in a ratio 2:1.

Once the lipids composition free of solvent is ready, either said composition is already liquid at ambient temperature or said composition is heated (step e)) until complete liquefaction. This step is important to allow the homogenous coating of the liquid lipid composition onto the polymeric material. Advantageously, the heating temperature of step e) is of at least 25° C., advantageously between 65° C. and 200° C., more advantageously between 65° C. and 100° C. The heating temperature should be sufficiently high to obtain a liquid composition but not too high to avoid the degradation of the lipids.

Advantageously, before the coating step f), the polymeric material is brought to the same temperature than the lipid composition in step e). Such a step allows avoiding temperature difference during the coating and thus allowing obtaining a more homogenous coating.

The method of the invention then comprises a step of applying the liquid lipid composition onto the polymeric material. Advantageously, this step may be carried out by brush coating, spin coating or dip coating, advantageously by brush coating or spin coating.

After the coating step, the obtained coated polymer material is optionally heated for homogenization (step g)), advantageously at temperature of at least 25° C., advantageously between 65° C. and 200° C., more advantageously between 65° C. and 100° C. Advantageously, step g) is carried out at the same temperature than the one used in step e).

In the method of the invention, all the steps of heating can be made by means known from the one skilled in the art, for example by placing the material into an oven. Other heating means can be used such as hot plates, water bath or Peltier element.

Advantageously, the method of the invention allows obtaining a surface concentration of the lipid composition on the polymeric material that is between 500 µg/cm$^2$ and 2500 µg/cm$^2$, more advantageously between 800 µg/cm$^2$ and 1800 µg/cm$^2$.

In order to obtain such a surface concentration, the method of the invention optionally comprises a step h) of wiping off the excess lipid composition. Advantageously, the step of wiping off the excess lipid composition is carried out by absorption. After this step, the obtained coated polymer material is optionally heated for homogenization, advantageously at temperature of at least 25° C., advantageously between 65° C. and 200° C., more advantageously between 65° C. and 100° C., more advantageously at the same temperature than the one used in steps e) and g).

Advantageously, the non-biological skin model thus obtained is then allowed to cool down to ambient temperature (i.e. between 18 and 25° C.).

The method of the invention allows thus the control of the surface concentration of the lipid composition on the polymeric material and therefore the control of the surface properties of the non-biological skin model obtained.

Advantageously, the non-biological skin model obtainable by the method of the invention has a surface free energy ($\gamma$) of between 24 mJ/m$^2$ and 45 mJ/m$^2$, more advantageously of between 26 mJ/m$^2$ and 33 mJ/m$^2$.

Advantageously, the method of the invention allows obtaining a lipid coating which is composed of lipids that are not crystallized. Therefore, the method of the invention allows to obtain a non-biological skin model of the invention that exhibits an apparent homogeneous lipid coating over its entire surface (cf. FIG. 4C).

Advantageously, the non-biological skin model of the invention has a skewness factor between 0.0 and −2.5, more advantageously between −0.2 and −1.70, even more advantageously between −0.5 and −0.9. These values are in good agreement with in vivo literature data [8].

Advantageously, the non-biological skin model of the invention has an arithmetic mean height (Sa) of between 10 µm and 80 µm, more advantageously between 15 µm and 50 µm, more advantageously between 17 and 25 µm. These values are in good agreement with in vivo literature data [5,9].

Advantageously, the non-biological skin model of the invention has a maximum height (Sz) of between 75 µm and 2000 µm, more advantageously between 100 µm and 300 µm, more advantageously between 120 and 175 µm. These values are also in good agreement with in vivo literature data [5,9]. Further, the non-biological skin model of the invention has a surface pH of between 4.0 and 7.0; more advantageously between 4.2 and 6.8; more advantageously between 4.8 and 5.9. These values are in good agreement with in vivo literature data that are between 4.2 and 6.8 [10].

Another object of the invention is thus a non-biological skin model obtainable by the method of the invention and advantageously having the above recited properties/characteristics.

In the following, the terms "the non-biological skin model (NBSM) of the invention" encompasses the NBSM of the invention as described above and the NBSM obtainable by the method of the invention as described above.

The inventors have also found that the NBSM of the invention presents potential uses for the characterization of residual film present on skin after topical application. Physico-chemical study highlights the similarity between in vivo skin and NBSM behaviour in contact with cosmetic ingredients and emulsions. This can be of great interest to develop the knowledge of residual cosmetic film after application of raw materials or products such as gels or emulsions. This is a key area for sensory characterization but also for efficacy assessments.

The NBSM of the invention is also of great interest to study efficacy of new cosmetic products on skin surface but also for more fundamental researches. Lipid composition can be tuned to mimic cutaneous disorders link to a modification in skin lipids such as atopic dermatitis or symptoms of dry skin. This can obviously constitute a novel way for characterizing those skin disorders and their physico-chemical consequences.

The NBSM of the invention may also be used to study the impacts of many external factors such as UV radiation, ozone or urban pollutants on skin surface physico-chemistry and to understand particles or microorganisms adhesion. The NBSM can be stored during several days or weeks under obscurity without any modifications. If necessary, it just has to be placed into the oven at a sufficient temperature to liquefy the lipid mixture in order to re-homogenize the lipid coating. The possibility of reusing the NBSM according to the invention is a great advantage over existing NBSM that cannot be retained after initial use. For example, the commercial non-biological skin model: Vitroskin® (IMS, Inc., Milford, CT) cannot be retained once hydrated.

Therefore, a third object of the invention is the use of the non-biological skin model of the invention for evaluating cosmetic products performance. Such a use may allow understanding the interaction (adverse or beneficial) of chemicals from consumer products, industrial chemicals and pharmaceuticals in direct and prolonged contact with the human skin.

Another object of the invention is the use non-biological skin model of the invention for evaluating the effect of pollution on skin surface properties.

Another object of the invention is the use non-biological skin model of the invention for evaluating the physico-chemistry of the skin, or evaluating the impact of the lipid composition or the skin topography on the surface free energy ($\gamma$) of the skin.

The examples which follow illustrate the invention without limiting its scope in any way.

EXAMPLES

Example 1. Preparation of a Non-Biological Skin Model According to the Invention A non-biological skin model (NBSM) according to the invention has been developed. It consists of two distinct parts (see FIG. 2). The first part is a polymeric material which reproduces skin surface topography. This polymeric material is coated with an artificial sebum which mimics lipid composition of skin face. This NBSM was prepared as described in the following paragraphs.

A. Preparation of a Polymeric Support Mimicking Skin Surface Topography

Figure 3:
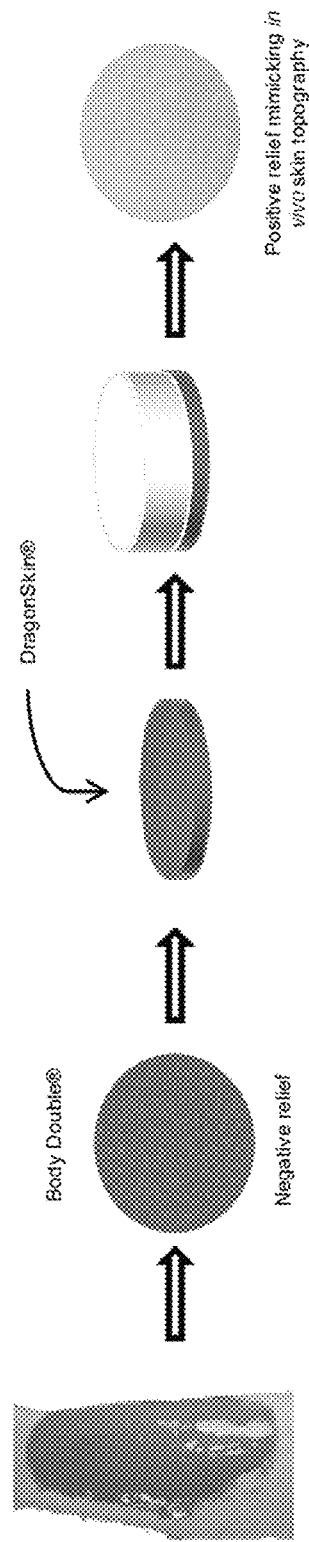
FIG. 3 is a scheme representing the preparation of the polymeric support mimicking skin surface topography.

A skin print was prepared in vivo using the biocompatible silicon Body Double® (Création Silicone, Jouy-en-josas, France) to obtain a silicon surface with a negative relief of the skin. This skin print was molded back using the silicone DragonSkin® (DragonSkin 20, Création-Silicone, Jouy-en-josas, France) (see FIG. 3): after mixing together an equal amount of the two components of the kit, the Dragonskin® was let degassing under high vacuum during 10 min. The viscous mixture was then poured onto the Body Double® skin print and let harden for at least 4 h.

B. Preparation of the Artificial Sebum

The artificial sebum was prepared following the composition described on table 2 [11]. All weighted lipids were dissolved in chloroform/methanol ($CHCl_3/MeOH$) 2:1 to reach a sebum concentration of 10 g/L. The solution was kept in the fridge (T=2-4° C.) until use. When solvents evaporation was necessary, a rotatory evaporator has been used (Rotavapor® R-300, BÜCHI Labortechnik AG, Flawil, Switzerland)

TABLE 2

Composition used for the artificial sebum [11]

| Chemical | Weight (% w/w) |
|---|---|
| Squalene | 10.29 |
| Palmityl palmitate | 19.42 |
| Oleyl oleate | 4.85 |
| Tristearin | 21.36 |
| Triolein | 10.68 |
| Stearic acid | 6.87 |
| Palmitic acid | 6.87 |
| Oleic acid | 13.74 |
| Cholesteryl oleate | 1.94 |
| Cholesterol | 3.88 |
| (±)-α-Tocopherol | 0.10 |
| Total | 100.00 |

The artificial sebum was then coated onto the previously described polymeric material. Two coating protocols have been tested: one according to the invention and one comparative protocol.

C. Coating Protocols

C1. Protocol 1 (Comparative)

The first protocol (referred as "Protocol 1") used a sebum solution in $CHCl_3/MeOH$ 3:7 at a concentration of 20 g/L. Sebum solution was pulverized through a spraying pump on the polymeric material [5,12]. 10 pulverizations at a distance of 5 cm were performed on a 1 cm×7 cm surface at ambient temperature. Surfaces as prepared were placed in a closed plastic tube to allow slow solvents evaporation and good homogeneity of the lipids coating.

The mean surface concentration obtained is 460 µg/cm², as measured using the mass difference before and after lipid coating.

C2. Protocol 2 (Invention)

The second protocol (referred as "Protocol 2" or protocol according to the invention) used pure sebum, without any solvent. The solvents were evaporated from the artificial sebum solution. Resulting lipids mixture was placed in an oven at 70° C. until complete liquefaction. The polymeric material was also placed in the oven at 70° C. during 15 min to avoid temperature difference during deposit. A thin pencil was used to apply a liquid lipid film onto the silicone support. Coated support was then placed back in the oven during 5 min for homogenization at 70° C. Excess lipids were wiped off using absorbent paper, and the coated silicone was placed again in the oven during 5 min at 70° C. The artificial skin model prepared as described was allowed to cool down to room temperature during few minutes.

The mean surface concentration obtained is 1500 µg/cm², as measured using the mass difference before and after lipid coating.

Example 2. Characterization of the Non-Biological Skin Model According to the Invention The non-biological skin model according to the invention that have been prepared in Example 1 with the coating protocol 2 (=NBSM protocol 2) is now characterized and compared to:

human living skin explants;
In vivo measurements;
A commercial non-biological skin model: Vitroskin® (IMS, Inc., Milford, CT) (=VS); and
The comparative NBSM prepared in Example 1 with the coating protocol 1 (=NBSM protocol 1).

A. Study Models

A1. Ex Vivo Skin (Human Living Skin Explants):

Human living skin explants were furnished by BIO-EC (Longjumeau, France); they were obtained from plastic surgery of the abdominal area of a 29 years old Caucasian woman, with her consent. To prepare skin explants, the subcutaneous fat was first removed using a scalpel, then skin (dermis and epidermis) was cut into approximately 2 cm diameter circles. The explants as prepared were placed in survival conditions using BIO-EC's explant medium (BEM) and maintained in an incubator at 37° C. in 5% CO2. Half of the BEM was replaced by fresh one every two days. Eight explants were used for the determination of surface free energy. They were kept into the incubator until contact angle measurements. There were gently wiped before measurements, to eliminate residual BEM present on the surface.

A2. In Vivo Measurements:

In vivo measurements were performed on the forearm of a 21 years old Caucasian woman with her consent. The analysed skin was kept unwashed for 2 hours and no treatment was performed before measurements.

A3. Commercial Non-Biological (NB) Skin Model:

The commercial Vitroskin® (IMS, Inc., Milford, CT) has been characterized and used in the study. It is a reference in terms of non-biological skin models for physico-chemical studies. The Vitroskin® (VS) is a synthetic skin model made with proteins and lipids which mimics skin surface properties such as ionic strength, pH, topography and critical surface tension. This NB skin model is used as skin substituent for in vitro SPF (Sun Protection Factor) measurements or for the study of emollients spreading. Prior to use, it required to be hydrated according to a standardized protocol developed by IMS. The pieces of VS were placed during 16-24 h at room temperature in a standard closed hydration chamber which contains 350 g of a mixture water/glycerin 85:15, poured in the bottom [13].

B. Surface Characterization of the Non-Biological Skin Model According to the Invention B1. Optical Microscopy:

Surfaces observation was performed using an optical microscope (DMLP/DC 300, Leica Microsystems, Wetzlar, Germany) equipped with a camera and controlled by the Leica Application Suite software. All pictures were obtained using transmission mode, at a magnification of ×50.

Optical microscopy is used for comparing the surface of NBSM protocol 1 and NBSM protocol 2. Sebum thin layers of the two models were visualized using optical microscope in transmission mode (see FIG. 4). FIG. 4 shows the microscopic images of the silicone support (FIG. 4A), the sebum thin layer deposed using protocol 1 (FIG. 4B) and protocol 2 (FIG. 4C) (Magnification ×50, transmission, non-polarized light NPL and polarized light PL).

Figure 4A:
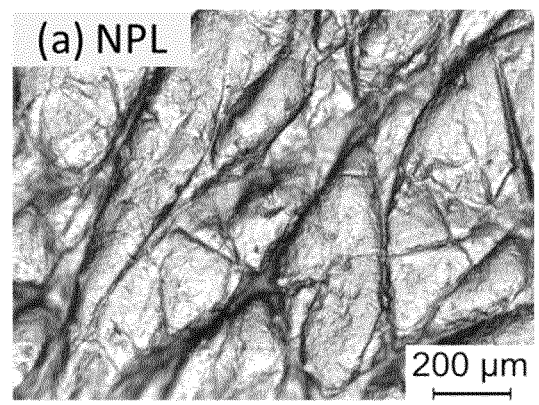
FIG. 4 represents the microscopic images of the silicone support (FIG. 4A), the lipid thin layer deposed using protocol 1 (FIG. 4B) and using the protocol 2 of the invention (FIG. 4C) (Magnification ×50, transmission, non-polarized light NPL and polarized light PL)
Figure 4A:
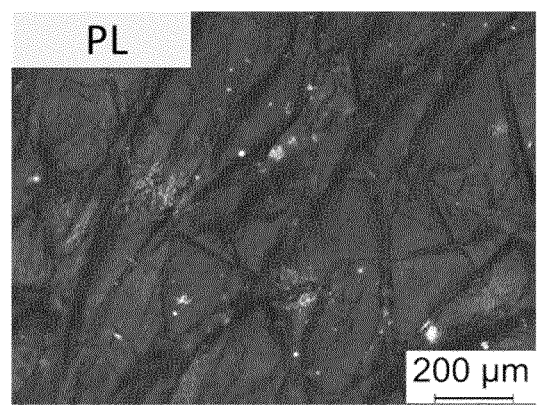
Figure 4B:
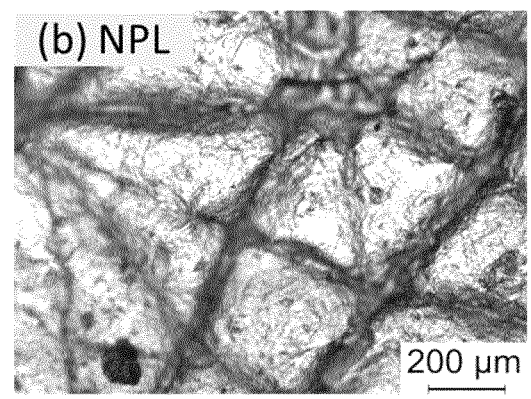
Figure 4B:
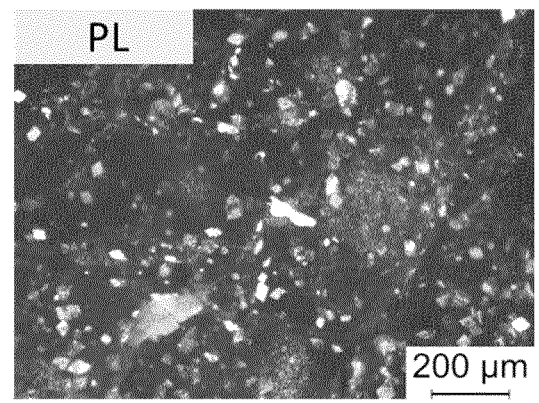
Figure 4C:
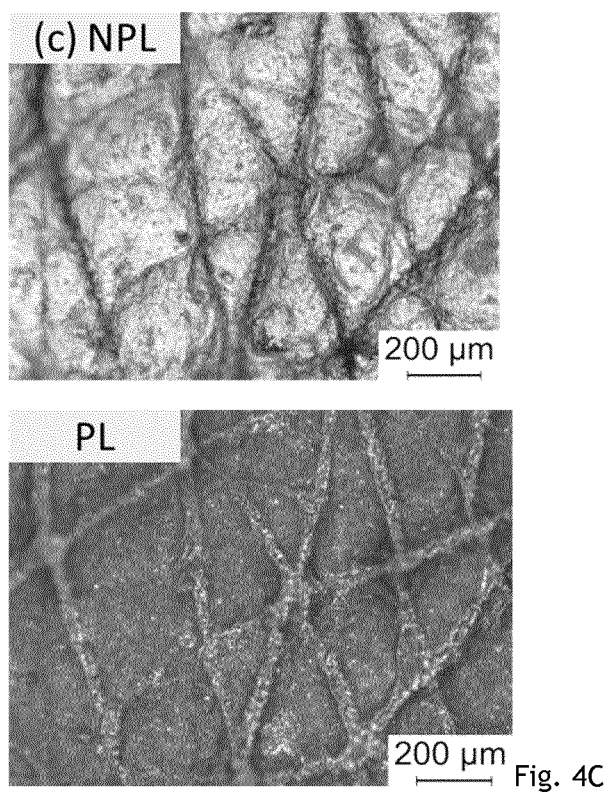

Presence of lipids on the polymeric support gives a granular aspect to the relief (FIG. 4B et 4C). Using protocol 1, lipids clearly crystallize, as evidenced on FIG. 4B: diamond-shape crystals are visible under polarized light. This crystallization, probably due to solvents evaporation, gives a glitter aspect to the surface, which is not appropriate for the lipid coating aspect. This crystallization is not observed for protocol 2 which exhibits an apparent homogeneous sebum layer over the entire surface (FIG. 4C).

B2. Infrared Spectroscopy:

A FT-IR Spectrometer spectrum (PerkinElmer, Inc., Waltham, Massachusetts, USA), connected to the Spectrum software was used. 4 spectra were recorded for each measurement, using the ATR mode (ZnSe crystal). The range of vibrations was from 4 000 to 650 cm-1.

Figure 5:
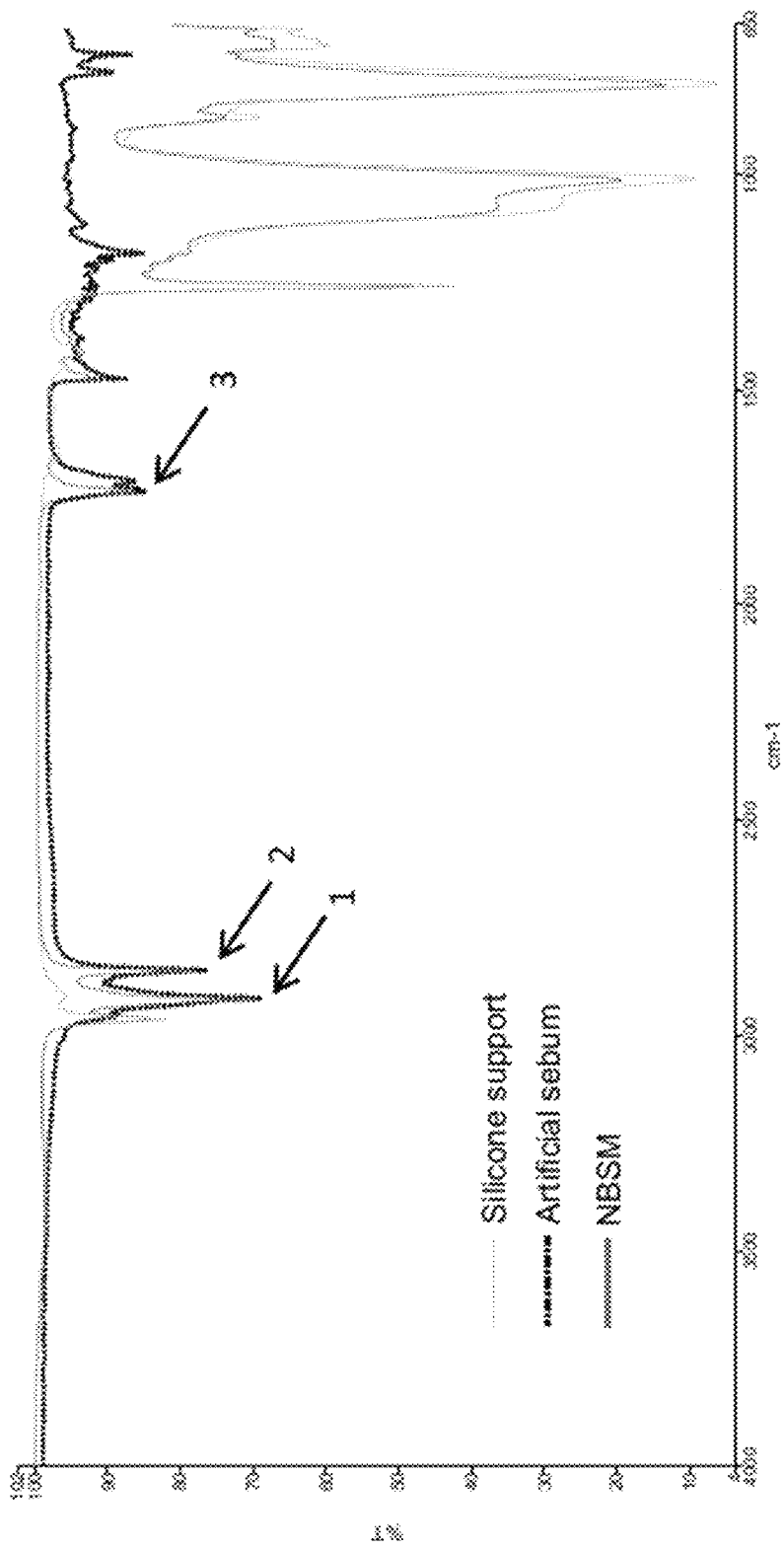
FIG. 5 represents the infrared spectra recorded before/after sebum coating using protocol 2 of the invention.

The lipids coated over the polymeric material of the NBSM protocol 2 were characterized by infrared spectroscopy and compared to the silicone support and the artificial sebum (see FIG. 5). Vibrations associated to the artificial sebum are visible on the NBSM infrared spectrum. There are indicated by the black arrows on FIG. 5, and its associated wavenumbers are reported in table 3 and compared to in vivo data.

TABLE 3

Wavenumbers (cm-1) for in vivo skin, the artificial sebum and the NBSM.

| Peak number (see FIG. 5) | In vivo skin | Artificial sebum | NBSM protocol 2 | Chemical structure associated |
|---|---|---|---|---|
| 1 | 2922.54 | 2914.65 | 2916.71 | $CH_2$ asymmetric stretch |
| 2 | 2853.14 | 2849.06 | 2849.74 | $CH_2$ symmetric stretch |
| 3 | 1741.63 and 1710.90 | 1735.33 and 1710.27 | 1735.13 | C═O esters (1720-1790) and fatty acids (1690-1720) |

Wavenumbers associated to $CH_2$ symmetric stretch (table 3) give information about lipids chain conformational packing. According to Mendelsohn and al [14], lipids chain packing evolves into the stratum corneum depth. Through the extreme surface (from 0 to 4 µm), $CH_2$ symmetric stretch wavenumber evolves from 2853 to 2849 cm-1 which corresponds to disordered and hexagonal chain packing. This is due to the specific lipids composition enriched in unsaturated lipids that covers the skin. Deeper into the stratum corneum, saturated lipids are predominant and show a highly ordered orthorhombic packing with associated wavenumbers between 2849 and 2847 cm-1. This highly ordered packing provides to the stratum corneum its water barrier function. In vivo FTIR spectra data recorded on the forehead shows a disordered chain packing, corresponding to a liquid state [14]. Artificial sebum and NBSM FTIR spectra show a hexagonal type chain packing, explained by the mixture of saturated and unsaturated lipids chains used. This is consequently an intermediary packing between liquid lipids state and highly ordered lipids organization (wavenumber <2849 cm-1). This conformation is hence consistent with extreme surface lipids chain packing between 2853 and 2859 cm 1 described by Mendelsohn [14].

Figure 6:
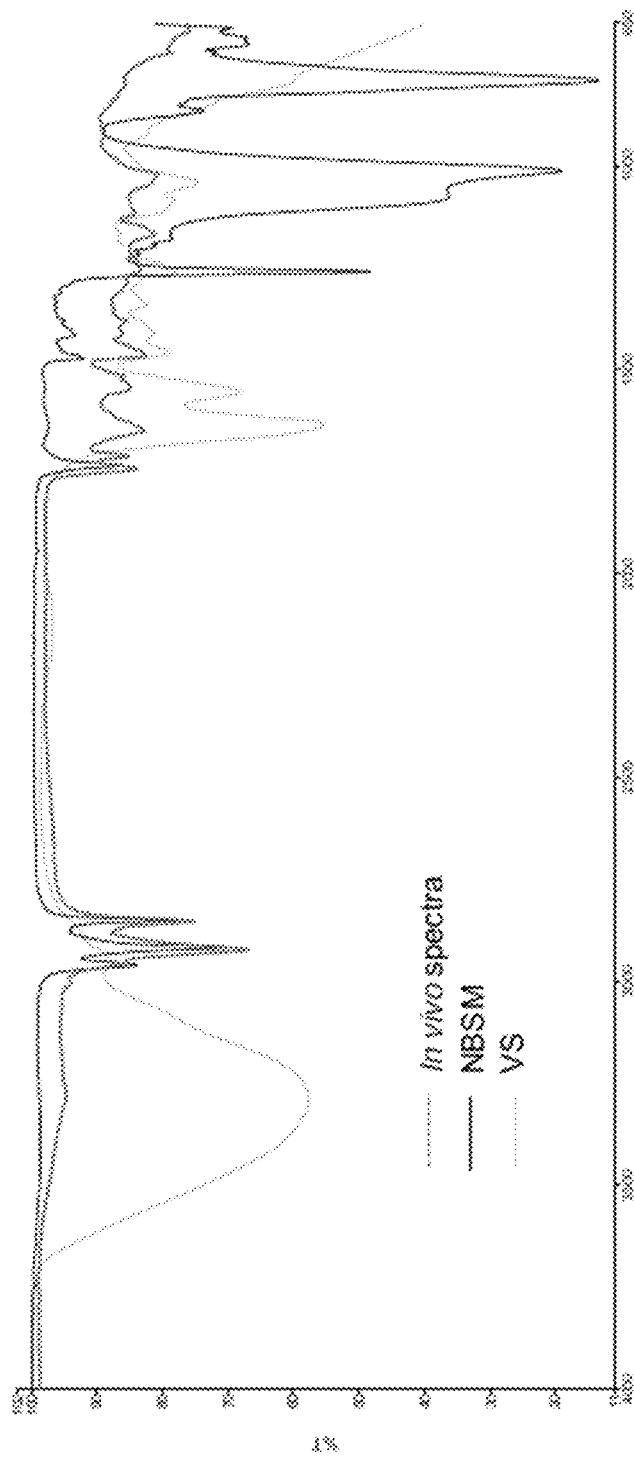
FIG. 6 represents the infrared spectra recorded in vivo, on the comparative VS and on the NBSM of the invention.

Infrared spectroscopy was also carried out to compare the NBSM protocol 2 and the VS model. Spectra obtained on both models are stacked with an in vivo spectrum recorded on the forehead (FIG. 6). As expected, FIG. 6 shows three distinct spectra which reflect the great differences in composition of the surfaces. NBSM protocol 2 is enriched in sebaceous lipids whereas they are absent on the VS. VS shows vibrations associated to ceramides (1631 cm-1 and 1553 cm-1). Those lipids are involved in stratum corneum lipids organization and consequently in skin barrier function. For the NBSM protocol 2, where ceramides are absent, we have shown that we are able to reach a physico-chemistry very close to ex vivo skin using only sebaceous lipids. The impact of ceramides on skin physico-chemistry is negligible when compared to sebaceous lipids. That's why the addition of ceramides for the present physico-chemical study was not relevant. VS is also well hydrated as highlighted by the important vibration associated to —OH structures (v=3286 cm-1). This hydration state is less obvious on in vivo spectrum. This can be a source of divergence concerning physico-chemical behavior of VS and in vivo skin.

B3. Digital Microscopy

A Keyence Microscope VHX-1000 (Keyence Corporation TSE, Osaka, Japan) using the VH-Z100R lens at a magnification of ×300 was used. 3D images were recorded in transmission mode and assembled to obtain a 1600×1200 pixels size.

Roughness profiles and parameters were calculated from 3D images of surfaces according to the ISO 25178 norm, using the Mountains Map® software (Digital Surf SARL, Besançon, France). The different roughness parameters obtained are listed in table 1.

Figure 7A:
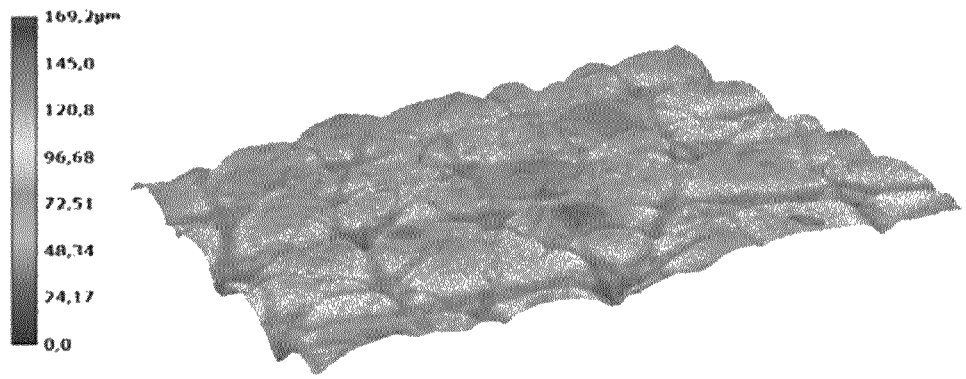
FIG. 7 represents the 3D microscopy images (Magnification ×300) of the NBSM of the invention (FIG. 7A) and of the comparative VS (FIG. 7B).
Figure 7B:
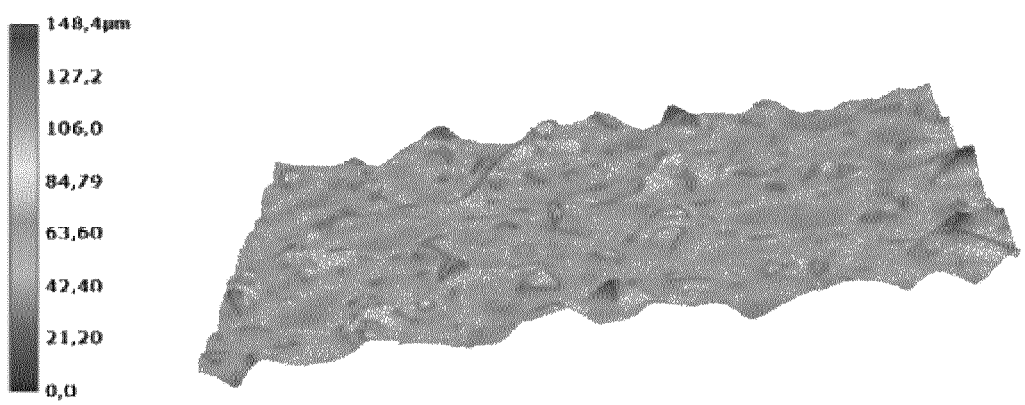
Figure 8A:
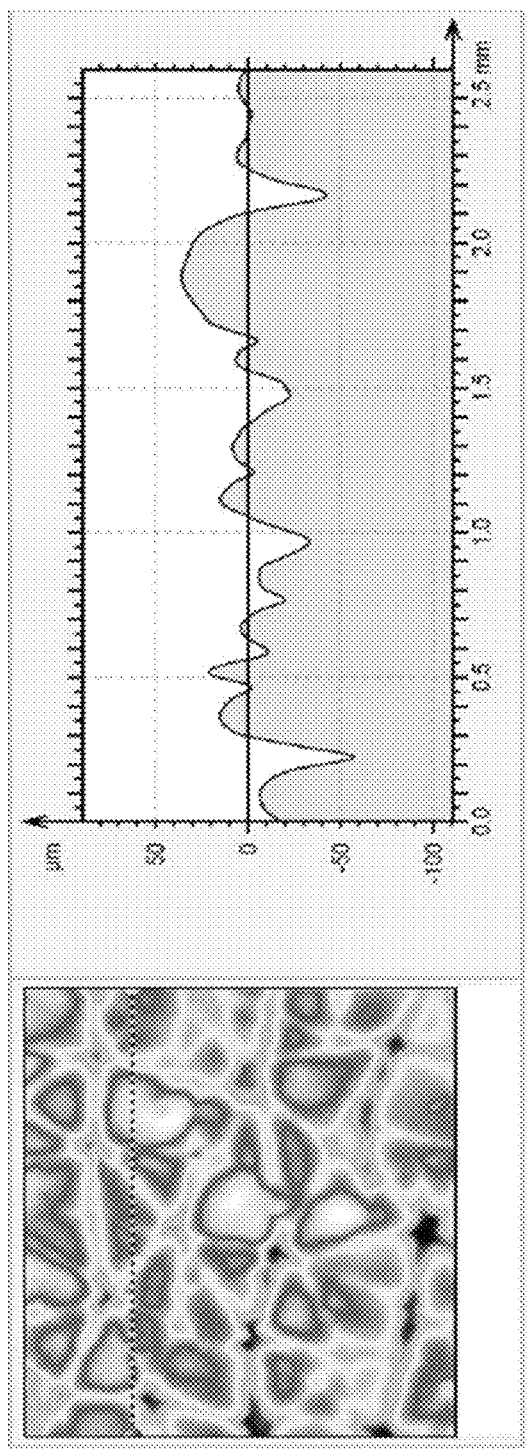
FIG. 8 represents the roughness profiles of the NBSM of the invention (FIG. 8A) and of the comparative VS (FIG. 8B).
Figure 8B:
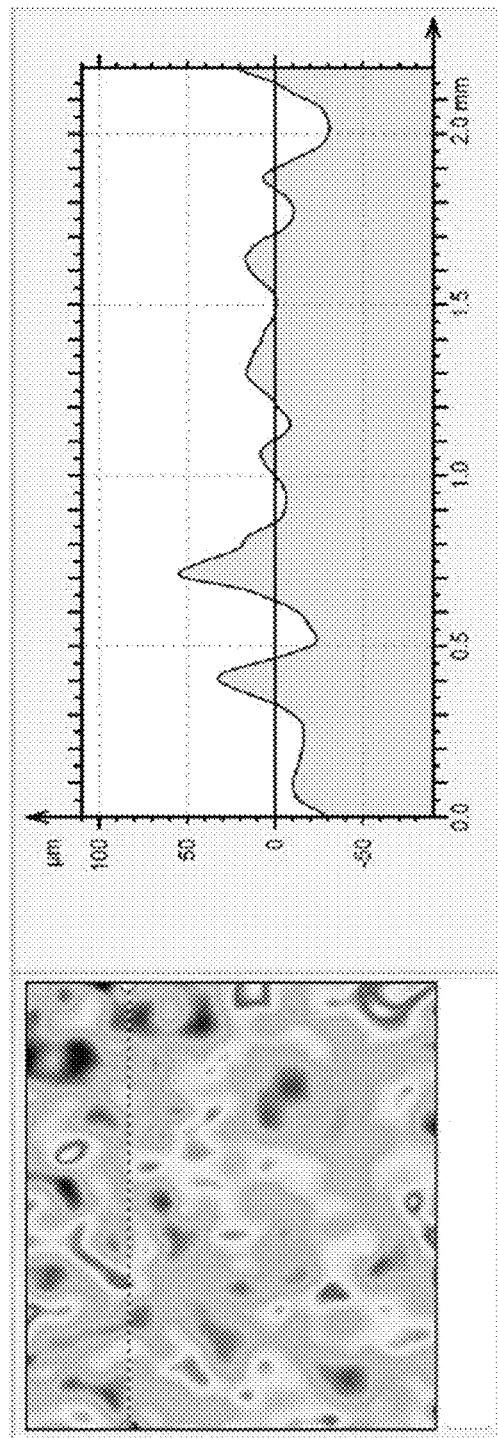

3D microscopy gives access to surface topography of the NBSM protocol 2 and the VS models and helps to study their roughness. 3D pictures obtained are presented on FIG. 7 (7A for the NBSM protocol 2 and 7B for the VS models) and roughness profiles are summarized in FIG. 8 (8A for the NBSM protocol 2 and 8B for the VS models).

Roughness parameters are summarized in table 1. Results highlight that both models shows Sa and Sz in the order of magnitude of in vivo skin [5,8]. An important difference between the NBSM protocol 2 and the VS concerns the skewness factor Ssk: $Ssk_{NBSM}$=−0.739 against $Ssk_{VS}$=0.648. This important parameter describes surface morphology: a positive Ssk value corresponds to a surface showing peaks and protuberance projecting above the average height whereas a negative Ssk value corresponds to a tray surface with deep scratches and pores. Those values are in accordance with visual observations made on FIGS. 7A and 7B. Consequently, parameter Ssk is clearly discriminant between both non-biological models. In addition, in vivo literature data reports negative Ssk values between −0.46 and −0.91. Skewness factor of NBSM protocol 2 is so in good agreement with in vivo parameter.

TABLE 4 roughness parameters calculated on NBSM protocol 2 and on VS where Sa: Arithmetic mean height and Sz: Maximum height

| Roughness parameters | In vivo [11], [33] (volar forearm) | NBSM protocol 2 | VS |
| --- | --- | --- | --- |
| Sa (µm) | [17; 20] | 23.4 | 15.4 |
| Sz (µm) | [119; 125] | 169 | 148 |
| Ssk | [−0.46; −0.91] | −0.739 | 0.648 |

The NBSM protocol 2 mimics forearm skin relief with much more accuracy than VS. As a consequence, in the aim to compare contact angle measurements performed on in vivo volar forearm the NBSM protocol 2 appears more suitable because surface roughness has a significant impact on contact angle measurements.

C. Surface Free Energy Determination

C1. Advancing Contact Angle Measurements:

Contact angle measurements were performed using a portative goniometer PGX+(ScanGaule, Gravigny, France) connected to the PGPlus software. This goniometer is equipped with a high-resolution camera to acquire images, with a specific lightening system associated with a mirror to visualize the droplet. The syringe used for droplets deposition has an intern diameter of 0.77 mm. Measurements were performed at room temperature (20±1.5° C.). Advancing contact angle $\theta_A$ is the highest value of contact angle measured prior to drop baseline displacement when the drop volume is increased. A small drop was deposited on the surface and its volume was increased by the addition of five successive drops. The final drop reached a volume of approximately 7 µl. Five pictures were taken immediately after the addition of each drop. Total time of the experiment is around 20 seconds, so evaporation or penetration of liquid is neglected. Contact angle from both sides of the drop were calculated using the software program. OA was then the maximum value obtained from the mean of both sides of drop among these five pictures. Advancing contact angle measurements for each liquid were performed at least in triplicate for each study model.

C2. Liquids for Contact Angle Measurements:

Three reference liquids were used to perform surface free energy calculation: ultrapure water (resistivity of 18 MΩ·cm-1 at 25° C.), diiodomethane (analytical grade, 99% purity) and formamide (analytical grade, 99% purity) (Sigma Aldrich, Saint-Louis, Missouri). Their surface free energy components values are reported in table 5.

TABLE 5

Surface free energy components of water, diiodomethane and formamide [15].

| Liquid | $\gamma l$ (mJ · m$^{-2}$) | $\gamma_l^{LW}$ (mJ · m$^{-2}$) | $\gamma_l^+$(mJ · m$^{-2}$) | $\gamma_l^-$(mJ · m$^{-2}$) |
| --- | --- | --- | --- | --- |
| Water | 72.8 | 21.8 | 25.5 | 25.5 |
| Diiodomethane | 50.8 | 50.8 | 0.72 | 0 |
| Formamide | 58 | 39 | 1.92 | 47.0 |

C3. Surface Free Energy Determination

To determine the surface free energy of solid surfaces, one of the most recent approaches has been developed by Van Oss and co-workers [1,16]. They suggest that solid and liquid surface free energy can be divided into two components: the Lifschitz-Van der Waals component (γLW), which corresponds to the Van der Waals interactions (Keesom, Debye, London), and the acid-base component (γAB) which corresponds to the acidic and basic interactions, according to the Lewis concept:

$$\gamma = \gamma^{LW} + \gamma^{AB} \tag{1}$$

This acid-base component can be expressed by the geometrical mean of two parameters: γ* (electron acceptor) and γ⁻ (electron donor):

$$\gamma^{AB} = 2\sqrt{\gamma^+ \gamma^-} \tag{2}$$

This last component includes the hydrogen bounding and the IT-electron interactions. Surface free energy can be calculated from contact angle measurements using the Young equation:

$$\gamma_L \cos \theta = \gamma_S - \pi_e - \gamma_{SL} \tag{3}$$

Where $\gamma_L$ is the liquid surface tension, θ is the contact angle, $\gamma_S$ is the solid surface free energy, $\pi_e$ the film pressure of the liquid and $\gamma_{SL}$ the interfacial surface free energy. "L" and "S" refer to liquid and solid respectively. $\pi_e$ can be neglected for low energy solids like skin [4].

According to Van Oss, the interfacial surface free energy can be expressed as follow:

$$\gamma_{SL} = \gamma_S^{LW} + \gamma_L^{LW} - 2\sqrt{\gamma_S^{LW}\gamma_L^{LW}} + 2(\sqrt{\gamma_S^+\gamma_S^-} + \sqrt{\gamma_L^+\gamma_L^-} - \sqrt{\gamma_S^+\gamma_L^-} - \sqrt{\gamma_S^-\gamma_L^+}) \quad (4)$$

Thus, the Young equation can be written:

$$(1+\cos\theta)\gamma_L = 2\sqrt{\gamma_L^{LW}\gamma_S^{LW}} + 2\sqrt{\gamma_L^+\gamma_S^-} + 2\sqrt{\gamma_L^-\gamma_S^+} \quad (5)$$

Following this equation, the surface free energy of the solid surface can be determined with using at least three reference liquids of known components values.

The Van Oss model has been defined for a smooth and homogeneous surface. For a rough surface, the roughness coefficient define by Wenzel et al [17] should be used to adjust contact angle value:

$$\cos\theta^* = r\cos\theta$$

Where $$r = \frac{\text{real surface area}}{\text{appearing surface area}} \geq 1$$

the roughness coefficient, $\theta^*$ the measured contact angle, $\theta$ the real contact angle.

Nevertheless, some studies dealing with the effect of roughness on wettability of random surface like skin show that this relation does not correctly describe real contact angle [1,18,19] Moreover, we try to reduce the impact of roughness on our results using surfaces of equivalent topography. That's why skin roughness has not been taken into account for this study.

In order to check the deposition protocol reliability, surface free energy was determined before and after sebum coating onto the silicone surface using protocol 1 and protocol 2.

Figure 9:
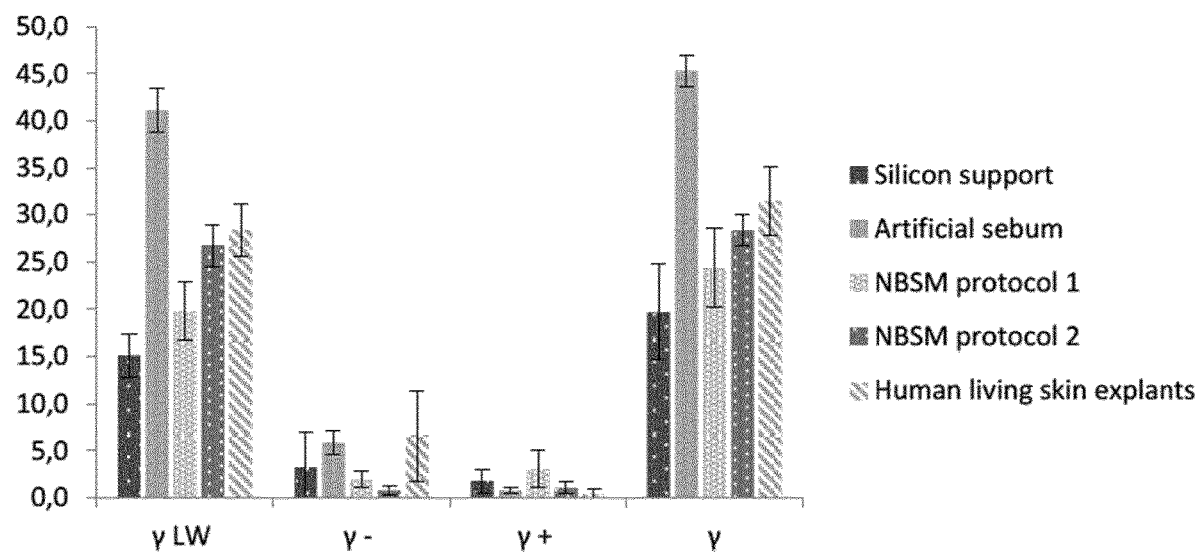
FIG. 9 represents the surface free energy parameters as determined for the different surfaces: the silicone surface, the artificial sebum, the NBSM prepared using protocol 1, the NBSM prepared using protocol 2 of the invention and human living skin explants, respectively.

Results are summarized in FIG. 9. This graph includes additional data resulting from human living skin explants measurements.

Unsurprisingly, knowing the low surface tension of silicone polymers, the silicone surface obtained shows a low surface free energy ($\gamma$) when compared to ex vivo skin: 19.7±5.0 mJ/m² for silicone against 31.5±3.6 mJ/m² for ex vivo skin. Artificial sebum properties demonstrate that this coating increase the LW component value once applied on a given surface. Its high LW component value ($\gamma_{LWsebum}$=41.1±2.4 mJ/m²) can be explained by the composition of this lipids mixture. Indeed, triglycerides and other constitutive lipids with long carbon chain will highly interact with each other, increasing surface cohesiveness. This cohesion will increase surface energy, through apolar interactions. Thus, the addition of the sebum thin layer on the silicone allows reaching a value of 26.7±2.2 mJ/m² for the LW component on the NBSM prepared with protocol 2, in good agreement with the value of 28.4±2.8 mJ/m² calculated on human living skin explants. Noteworthy those results are in accordance with literature data calculated from in vivo measurements [1].

Values obtained for the NBSM following Protocol 2 for sebum deposition are therefore consistent with the measurements carried out with the human living skin explants. It is interesting to note that the basic component ($\gamma^-$) is slightly lower for coated NBSM when compared to human living skin explants. Nevertheless, this component depends on the type of skin: according to Mavon et al [1,2], sebum enriched skins show higher surface free energy values than poor sebum area. This difference for the surface free energy is due to the higher basic component value for sebum-rich skins. They assumed that this high basic component can be related to sebaceous lipid level and to its amphiphilic lipids content, specifically free fatty acids. But the artificial sebum studied here did not show particularly high basic component: $\gamma^-_{sebum}$=5.8±1.2 mJ/m². Consequently, the NBSM did not reach as high $\gamma^-$ as found on rich sebum in vivo skins. Both protocols show low values for the basic component: 1.9±0.8 mJ/m² for protocol 1 and 0.7±0.4 mJ/m² for protocol 2. The NBSM physico-chemistry is therefore much closer to poor sebum skin area as forearm skin rather than forehead skin.

D. Conclusion

Results clearly indicate that Protocol 1 is less efficient than Protocol 2 to reach properties close to ex vivo human skin. Indeed, one can observe that surfaces prepared using protocol 1 show higher values for the acidic component (3.1±2.0 mJ/m²), in comparison with ex vivo skin (0.5±0.5 mJ/m²). Then, the LW component determined for protocol 1 (19.8±3.1) is lower than the one obtained ex vivo. Protocol 2 is so more appropriate to mimic skin physico-chemistry. In addition, the absence of solvent in Protocol 2 is undoubtedly advantageous for environmental concerns and it also prevents the risk of dissolution of the polymeric material once covered by the sebum. Moreover, optical microscopy proves that sebum distribution was more homogeneous and that lipids crystallization was limited with Protocol 2. For all these reasons, the second protocol was selected and applied for the rest of the study.

To summarize, the NBSM protocol 2 developed in the present invention shows a chemical composition and topographic properties close to ex vivo skin. Moreover, as shown in previous paragraph, the sebum coating has been optimized to be as close as possible to skin physico-chemistry. All these results demonstrate that the NBSM is a relevant skin model to mimic a large range of skin surface properties. In order to show the interest of NBSM, complementary measurements have been performed to evaluate its interactions with cosmetic ingredients and its physico-chemical behaviour after cosmetic products application.

Example 3. Physico-Chemical Study of Cosmetic Ingredients and Emulsions

A. Cosmetic Ingredients and Emulsions Used for Physico-Chemical Study:

Cosmetic grade ingredients used for this study are presented with their physico-chemical properties in table 6. Silicone was supplied by Evonik Goldschmidt (Essen, Germany); ester was kindly given by Stéarinerie Dubois (Boulogne-Billancourt, France); isohexadecane was supplied by IMCD Group (Cologne, Germany) and the argan oil was supplied by Olvea Group (Saint-Léonard, France).

TABLE 6

Cosmetic ingredients used

| INCI name | Code | Structure | Surface tension (mJ/m$^2$) at 20° C. |
|---|---|---|---|
| Cyclopentasiloxane | CPS | 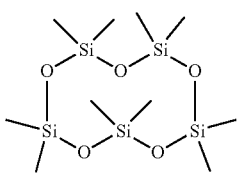 | 18.0 |
| Propanediol dicaprylate | PDC | 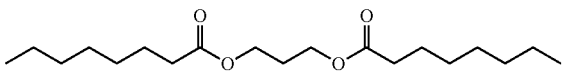 [SMILES: CCCCCCCC(=O)OCCCOC(=O)CCCCCCC] | 33.1 |
| Isohexadecane | IHD | 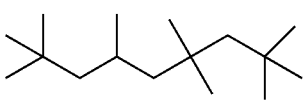 [SMILES: CC(CC(C)(C)C)CC(C)(C)CC(C)(C)C] | 24.4 |
| Argan oil | AO | 95% triacylglycerols<br>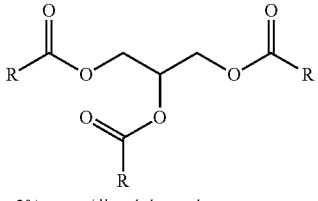<br>~2% mono/diacylglycerols<br>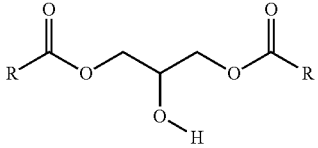<br>~2% free fatty acids<br>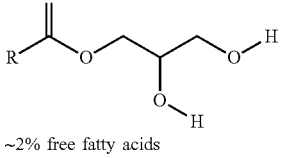 | 31.7 (experimental data) |

Three emulsions listed in Table 7 were also used: two commercial ones and a standard emulsion specifically developed at laboratory scale according to the protocol described in [20].

TABLE 7

Description of emulsion used

| Name | Code | Application |
|---|---|---|
| Nivea Crème | NC | Moisturizing and nourishing W/O emulsion |
| Gel hydroalcoolique Assanis Family | GHA | Disinfection aqueous gel |
| Standard Emulsion | SE | O/W emulsion |

B1. Advancing Contact Angle Measurements:

Contact angle measurements were performed as described in example 2 parts C1 and C2

B2. Water Contact Angle after Product Application:

50 μL of each cosmetic ingredient and emulsion (table 6 and 7) were manually spread on 10 cm$^2$ surface areas by 40 rotations. Water contact angle measurements were performed 1 min and 3 min after application, in triplicate.

B3. Ingredient Contact Angle on Untreated Surfaces:

Contact angle of AO, IHD, CPS and PDC (table 6) were measured in triplicate on each study models. Drop deposition protocol was the same as the one described previously.

Figure 10:
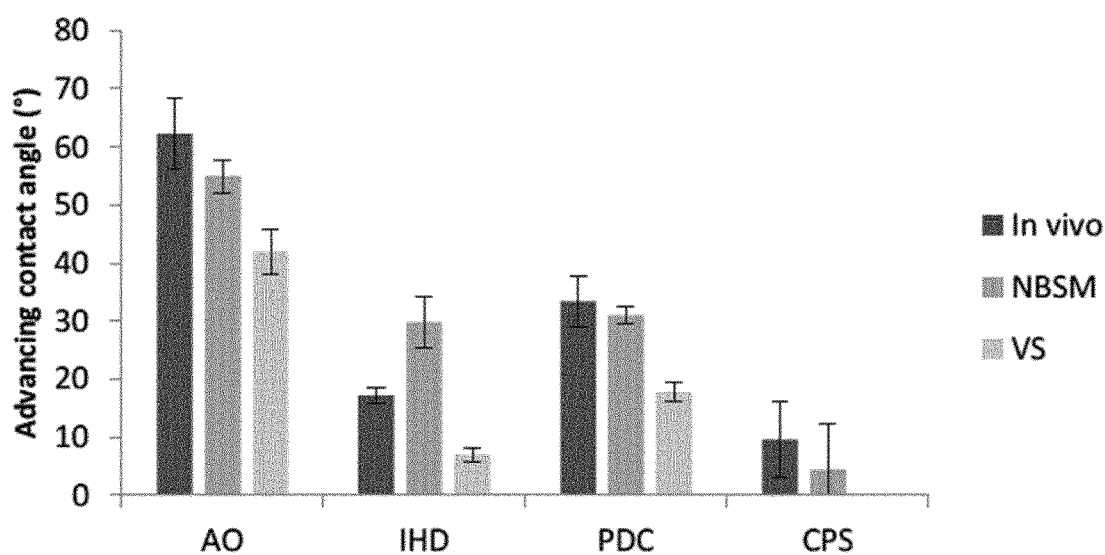
FIG. 10 represents the contact angle values measured for AO, IHD, PDC, and CPS on the NBSM of the invention (dark grey), the comparative VS (light grey), and in vivo (black).

C. Results:

Study of Emollients Spreading:

Contact angle measurements are part of instrumental methods which are used to study spreading properties of emollients on skin. Spreading of emollients is an important purpose for sensory quality of a cosmetic product but also for its efficacy, above all for sunscreens. Indeed, sun protection factor is on the one hand due to solar filters present in emulsions and on the other hand due to the homogeneity of the residual film once the product spread onto the skin surface. Thus, among other parameters responsible for the film formation and homogeneity, the spreading appears of primary importance [21,22]. In order to evaluate spreading properties of cosmetic ingredients, contact angle measurements were performed with 4 ingredients: CPS, PDC, AO and IHD on the different surfaces studied herein. Results obtained on the NBSM protocol 2, on the VS and in vivo are presented on FIG. 10. From a general point of view, contact angle measured using the four different ingredients appear very similar between the NBSM protocol 2 and in vivo surfaces. On the opposite, advancing contact angles as measured for the different emollients on the VS are lower when compared to both in vivo and NBSM protocol 2 surfaces. Those results mean that the NBSM surface, specifically developed in the present work, interacts with products in the same way as the in vivo skin. The only difference concerns IHD which shows more affinity with in vivo skin than with the NBSM protocol 2. This can be explained by the higher skin LW component compared to the NBSM, thus inducing higher interactions with the apolar IHD. However, this NBSM undoubtedly constitute an efficient support to evaluate emollient spreading if compared to VS. Indeed, lower contact angle measured on VS indicate that each ingredient shows more affinity with the VS than with in vivo skin. We decide to compare data obtained with ex vivo values as it is not possible to determine surface free energy of in vivo skin due to the toxicity of the reference liquids used. Moreover, literature data show large variability inherent to inter-individual difference. As a consequence, spreading of cosmetic ingredients is enhanced due to a higher surface free energy for VS ($\gamma_{VS}$=35.8 mJ/m$^2$) when compared to ex vivo skin and NBSM protocol 2. The hydration state of the VS may be responsible for this result as the presence of water classically tends to increase surface free energy value. According to those results, the NBSM protocol 2 interestingly appears as a relevant tool to study residual film present on the skin surface after topical application. The physico-chemical characterization of cosmetic residual films is presented below.

Characterization of Residual Film after Cosmetic Products Application:

Characterization of the residual film of an ingredient or an emulsion on skin is a very interesting topic as its homogeneity, composition and stability greatly impact skin surface properties and, consequently, the efficacy of cosmetic actives and products. To study the physico-chemistry of residual films, water contact angle have been measured on VS, NBSM protocol 2 and in vivo at two distinct times (1 and 3 minutes) once a series of cosmetic products applied following the protocol described above. Results are presented on FIG. 11. Water contact angles measured 1 min after surface treatment with cosmetic ingredients are classified as follow: $\theta_{water}$/PDC<$\theta_{water}$/AO<$\theta_{water}$/IHD<$\theta_{water}$/CPS for both in vivo skin and NBSM protocol 2, whereas $\theta_{water}$/IHD<$\theta_{water}$/PDC≈$\theta_{water}$/AO $\theta_{water}$/CPS for VS. Before products application, $\theta_{water\ in\ vivo}$=93.2±7.8°, $\theta_{water\ NBSM}$=114.2±5.8° and $\theta_{water\ VS}$=104.2±11.8°.

Globally, ingredients reduce water contact angle values for each surface. For NBSM and in vivo skin, results obtained are in accordance with surface tension values (Table 6) of each ingredient: the lower the ingredient surface tension the higher the water contact angle. Indeed, the ingredient residual film modifies skin composition and surface tension. As an example, CPS with low surface tension decreases skin surface energy.

Figure 11A:
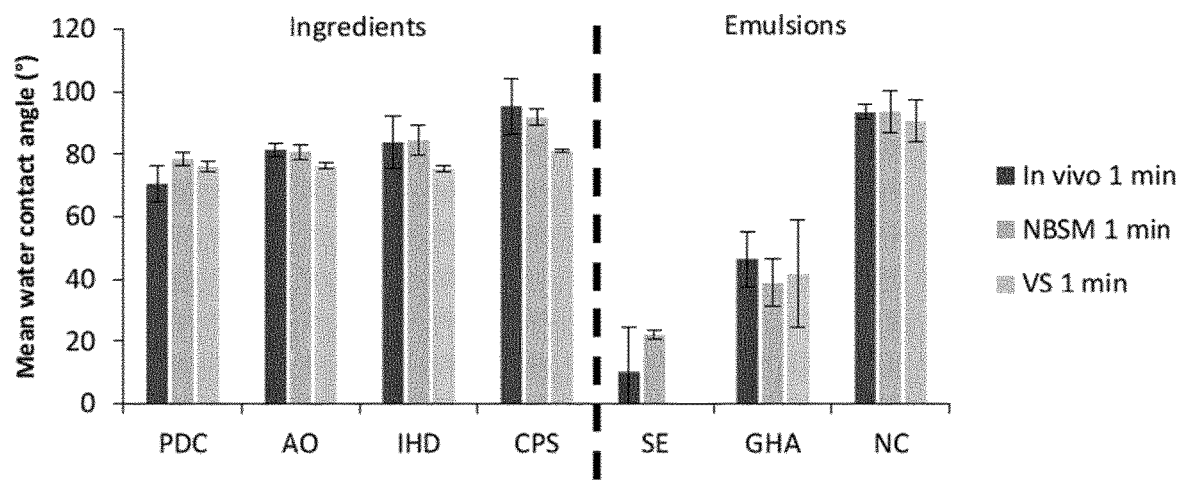
FIG. 11 represents the water contact angle determined 1 min (FIG. 11A) and 3 min (FIG. 11B) after product application. Three surfaces are compared: in vivo skin (dark), the NBSM of the invention (dark grey) and the comparative VS (light grey).
Figure 11B:
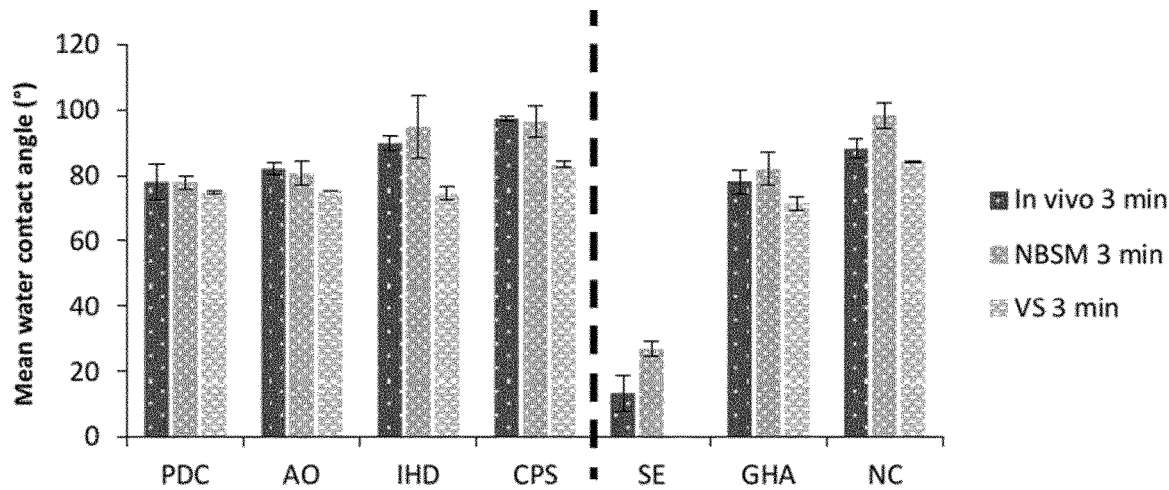

Concerning the emulsions, the differences between the 3 surfaces, namely in vivo, NBSM protocol 2 and VS, appear less pronounced. NC exhibits the highest values of water contact angle, followed by the hydro alcoholic gel, while SE obtained the lowest values (FIG. 11). Their composition can explain values obtained: SE and GHA contain more than 70% of water and isopropyl alcohol respectively which makes the skin more hydrophilic after application whereas for the inverse emulsion NC, its continuous oily phase is more important and makes the skin more hydrophobic.

The skin model VS displays surprisingly a water contact angle null for SE. Differences observed for VS in the measurements after emulsion application can be due to its absorption capacity and to its high hydration, as explained previously. Water from deposit drop can interact with the high amount of water contained in VS which decreased contact angle values.

Water contact angle measured 3 min after treatment can be useful to evaluate the evolution of residual film on skin at longer time. For instance, the GHA shows an important increase in water contact angle between 1 min and 3 min after application. This is probably the result of isopropyl alcohol evaporation. In this case, only non-volatile and non-penetrating ingredients of the product remain on the skin 3 min after application. In opposition, the SE residual film did not significantly evolve after 3 min which means that both penetration and evaporation of compounds are not achieved.

Whatever the type of ingredient (polar or apolar oil, ester, silicon) or emulsion used, advancing water contact angle determine on NBSM and in vivo remain very close. VS is also performing, but in a lesser extent, due to few differences with in vivo measurements. VS also shows less variation among products, above all 3 minutes after application. To sum up, results obtained in the present section with NBSM are very promising in the aim to study residual films of cosmetic products and to highlight their effects on skin physicochemical properties.

Figure 12:
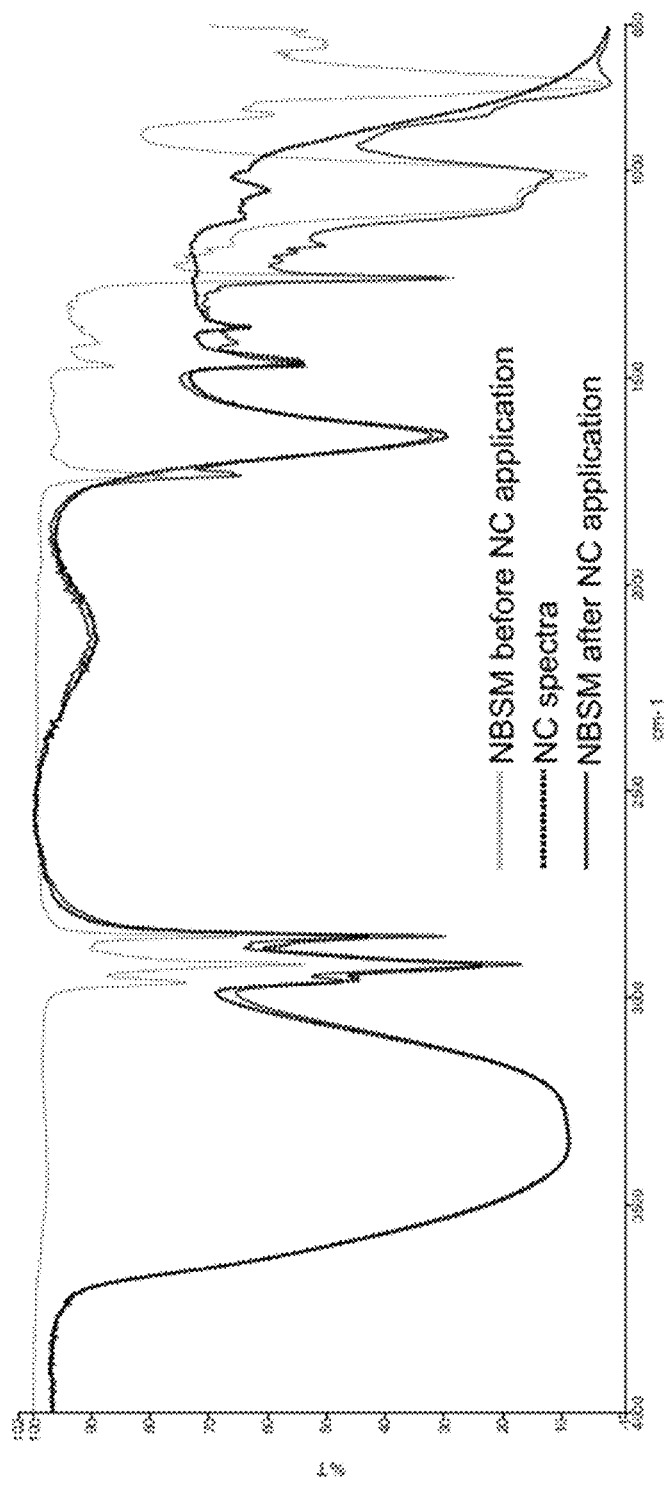
FIG. 12 represents the IR spectra recorded on the NBSM of the invention before and 3 min after NC application on the NBSM.

The final example of application concerns the use of NBSM to characterize residual film after product application in terms of chemical composition, as shown on infrared spectra on FIG. 12 before and after NC application to skin. According to the ingredient applied, we can highlight its presence on NBSM surface by following one or more vibrations associated to their original spectrum. In this example, the vibration at 1639 cm 1 is characteristic of the presence of the NC emulsion on the surface. Such an illustration highlights how it can be very interesting to study the chemical composition of the residual film after application and its evolution over time with using NBSM surface. Another perspective covers the investigation of the homogeneity of a residual film by means of IR microscopy or Raman microscopy for instance. Studies of residual film present on skin after cosmetic products application are not very numerous in literature, probably because of the difficulty to study in vivo properties of skin surface on the one hand, and because of the cost of an ex vivo study on the other hand. This new NBSM can efficiently help fulfilling this lack of information thanks to its easy handling and utilization, low cost and well designed to study skin surface properties. Moreover, in the aim to study a new cosmetic ingredient whose toxicity has not been evaluated, the use of a non-biological skin model such as NBSM is of great interest: it allows studying cosmetic ingredients properties without any safety trouble and with no particular technical difficulty.

BIBLIOGRAPHY

[1] A. Mavon, H. Zahouani, D. Redoules, P. Agache, Y. Gall, P. Humbert, Sebum and stratum corneum lipids increase human skin surface free energy as determined from contact angle measurements: a study on two anatomical sites, Colloids and Surfaces B: Biointerfaces. 8 (1997) 147-155.

[2] A. Mavon, D. Redoules, P. Humbert, P. Agache, Y. Gall, Changes in sebum levels and skin surface free energy components following skin surface washing, Colloids and Surfaces B: Biointerfaces. 10 (1998) 243-250. doi: doi: 10.1016/S0927-7765 (98) 00007-1.

[3] J. Stahl, F. Niedorf, M. Kietzmann, Characterisation of epidermal lipid composition and skin morphology of animal skin ex vivo, European Journal of Pharmaceutics and Biopharmaceutics. 72 (2009) 310-316. doi: 10.1016/j.ejpb.2008.09.013.

[4] M. Nachman, S. E. Franklin, Artificial Skin Model simulating dry and moist in vivo human skin friction and deformation behaviour, Tribology International. (2016). doi: 10.1016/j.triboint.2016.01.043.

[5] L.-C. Gerhardt, A. Schiller, B. Müller, N. D. Spencer, S. Derler, Fabrication, Characterisation and Tribological Investigation of Artificial Skin Surface Lipid Films, Tribology Letters. 34 (2009) 81-93. doi: 10.1007/s11249-009-9411-0.

[6] A. K. Dąbrowska, G.-M. Rotaru, S. Derler, F. Spano, M. Camenzind, S. Annaheim, R. Stämpfli, M. Schmid, R. M. Rossi, Materials used to simulate physical properties of human skin, Skin Res Technol. 22 (2016) 3-14. doi: 10.1111/srt.12235.

[7] J. C. Charkoudian, A model skin surface for testing adhesion to skin, Journal of the Society of Cosmetic Chemists. 39 (1988) 225-234.

[8] J. m. Lagarde, C. Rouvrais, D. Black, Topography and anisotropy of the skin surface with ageing, Skin Research and Technology. 11 (2005) 110-119. doi: 10.1111/j.1600-0846.2005.00096.x.

[9] S. Akazaki, H. Nakagawa, H. Kazama, O. Osanai, M. Kawai, Y. Takema, G. Imokawa, Age-related changes in skin wrinkles assessed by a novel three-dimensional morphometric analysis, British Journal of Dermatology. 147 (2002) 689-695. doi: 10.1046/j.1365-2133.2002.04874.x.

[10] H. Wagner, K.-H. Kostka, C.-M. Lehr, U. F. Schaefer, pH profiles in human skin: influence of two in vitro test systems for drug delivery testing, European Journal of Pharmaceutics and Biopharmaceutics. 55 (2003) 57-65. doi: 10.1016/S0939-6411 (02) 00125-X.

[11] A. B. Stefaniak, C. J. Harvey, P. W. Wertz, Formulation and stability of a novel artificial sebum under conditions of storage and use, International Journal of Cosmetic Science. 32 (2010) 347-355. doi: 10.1111/j.1468-2494.2010.00561.x.

[12] S. Jones, E. Rio, C. Cazeneuve, L. Nicolas-Morgantini, F. Restagno, G. S. Luengo, Tribological influence of a liquid meniscus in human sebum cleaning, Colloids and Surfaces A: Physicochemical and Engineering Aspects. 498 (2016) 268-275. doi: 10.1016/j.colsurfa.2016.03.047.

[13] IMS In Vitro SPF/UVA Protocol for use with VITRO-SKIN Substrate, (n.d.). http://www.ims-usa.com/ittrium/reference/A1x75bx1xa4y1x762x1xa1y1x844x1x65y1x 774x1x65y1x7bex1x6 5y1x85ax1x94y8x7c0x8x1/HydrationProtocol_UpdatedbyPTSJanuary2012rev1308.pdf (accessed Apr. 29, 2016).

[14] R. Mendelsohn, C. R. Flach, D. J. Moore, Determination of molecular conformation and permeation in skin via IR spectroscopy, microscopy, and imaging, Biochimica et Biophysica Acta (BBA)-Biomembranes. 1758 (2006) 923-933. doi: 10.1016/j.bbamem.2006.04.009.

[15] B. Janczuk, E. Chibowski, J. M. Bruque, M. L. Kerkeb, F. Gonzalez Caballero, On the consistency of surface free energy components as calculated from contact angles of different liquids: an application to the cholesterol surface, Journal of Colloid and Interface Science. 159 (1993) 421-428.

[16] C. J. Van Oss, R. J. Good, M. K. Chaudhury, Additive and nonadditive surface tension components and the interpretation of contact angles, Langmuir. 4 (1988) 884-891. doi: 10.1021/la00082a018.

[17] R. N. Wenzel, Resistance of solid surfaces to wetting by water, Industrial & Engineering Chemistry. 28 (1936) 988-994. doi: 10.1021/ie50320a024.

[18] J. P. Oliver, C. Huh, S. G. Mason, An experimental study of some effects of solid surface roughness on wetting, Colloids and Surfaces. 1 (1980) 79-104. doi: 10.1016/0166-6622 (80) 80039-4.

[19] A. M. Cazabat, M. A. C. Stuart, Dynamics of wetting: effects of surface roughness, J. Phys. Chem. 90 (1986) 5845-5849. doi: 10.1021/j100280a075.

[20] L. Gilbert, C. Picard, G. Savary, M. Grisel, Impact of Polymers on Texture Properties of Cosmetic Emulsions: A Methodological Approach, J Sens Stud. 27 (2012) 392-402. doi: 10.1111/joss. 12001.

[21] G. Savary, M. Grisel, C. Picard, Impact of emollients on the spreading properties of cosmetic products: A combined sensory and instrumental characterization, Colloids and Surfaces B: Biointerfaces. 102 (2013) 371-378. doi: 10.1016/j.colsurfb.2012.07.028.

[22] L. Fageon, D. Moyal, J. Coutet, D. Candau, Importance of sunscreen products spreading protocol and substrate roughness for in vitro sun protection factor assessment, International Journal of Cosmetic Science. 31 (2009) 405-418. doi: 10.1111/j.1468-2494.2009.00524.x.

The invention claimed is:

1. A non-biological skin model comprising a polymeric material reproducing skin surface topography that is coated with a lipid composition,
   wherein the polymeric material is a material having a surface free energy ($\gamma$) of between 14 and 60 mJ/m$^2$,
   wherein the lipid composition comprises 14% to 60% of triglycerides, from 2% to 40% of free fatty acids, from 4% to 30% of wax esters, from 3% to 20% of squalene, and from 1% to 10% of cholesterol, by weight related to the total weight of the lipid composition, and
   wherein the surface concentration of the lipid composition on the polymeric material is between 500 µg/cm$^2$ and 2500 µg/cm$^2$.

2. The non-biological skin model according to claim 1, having a surface free energy ($\gamma$) of between 24 mJ/m$^2$ and 45 mJ/m$^2$.

3. The non-biological skin model according to claim 1, having a skewness factor between 0.0 and −2.5.

4. The non-biological skin model according to claim 1, wherein the lipids are not crystallized.

5. A method for preparing a non-biological skin model, comprising the following steps:
   a) Preparing a skin print with a negative relief of the skin;
   b) Molding back the skin print using a polymeric material that is a material having a surface free energy ($\gamma$) of between 14 and 60 mJ/m$^2$;
   c) Hardening;
   d) Preparing a lipid composition comprising from 14% to 60% of triglycerides, from 2% to 40% of free fatty acids, from 4% to 30% of wax esters, from 3% to 20% of squalene, and from 1% to 10% of cholesterol, and being free of solvent;

e) Optionally, heating the lipid composition until complete liquefaction, f) Applying the liquid lipid composition onto the polymeric material;

g) Optionally, heating for homogenization; and h) Optionally, wiping off the excess lipid composition and heating again for homogenization.

6. The method according to claim 5, wherein the step d) of preparing the lipid composition comprises a step d1) of dissolving the lipids in a solvent, and a step d2) of evaporating all the solvent.

7. The method according to claim 5, wherein the heating temperatures of steps e), g), and h) are, independently of each other, of at least 25° C.

8. The method according to claim 5, wherein before step f), the polymeric material is brought to the same temperature than the lipid composition in step e).

9. The method according to claim 5, wherein the step h) of wiping off the excess lipid composition is carried out by absorption.

10. The method according to claim 5, wherein the step f) of applying the liquid lipid composition onto the polymeric material is carried out by brush coating, spin coating or dip coating.

11. The method according to claim 5, wherein the surface concentration of the lipid composition on the polymeric material is between 500 µg/cm$^2$ and 2500 g/cm$^2$.

12. The method according to claim 5, wherein the obtained non-biological skin model has a surface free energy (γ) of between 24 mJ/m$^2$ and 45 mJ/m$^2$.

13. The method according to claim 5, wherein the obtained non-biological skin model has a skewness factor between 0.0 and −2.5.

14. The non-biological skin model according to claim 2, having a surface free energy (γ) of between 26 mJ/m$^2$ and 33 mJ/m$^2$.

15. The non-biological skin model according to claim 3, having a skewness factor between −0.2 and −1.7.

16. The method according to claim 7, wherein the heating temperatures of steps e), g), and h) are, independently of each other, of between 65° C. and 200° C.

17. The method according to claim 10, wherein the step f) of applying the liquid lipid composition onto the polymeric material is carried out by brush coating or spin coating.

* * * * *